US012376101B2

(12) United States Patent
Wang et al.

(10) Patent No.: US 12,376,101 B2
(45) Date of Patent: Jul. 29, 2025

(54) MANAGEMENT OF UPLINK TRANSMISSIONS AND WIRELESS ENERGY TRANSFER SIGNALS

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 17/751,314

(22) Filed: May 23, 2022

(65) Prior Publication Data

US 2023/0403697 A1 Dec. 14, 2023

(51) Int. Cl.
*H04W 72/1268* (2023.01)
*H04L 5/14* (2006.01)
(Continued)

(52) U.S. Cl.
CPC ........... *H04W 72/1268* (2013.01); *H04L 5/14* (2013.01); *H04W 72/0446* (2013.01); *H04W 72/0473* (2013.01); *H04W 72/51* (2023.01)

(58) Field of Classification Search
CPC ......... H04W 72/1268; H04W 72/0446; H04W 72/0473; H04W 72/51; H04L 5/14; H02J 50/20; H02J 50/001; H02J 50/80
See application file for complete search history.

(56) References Cited

U.S. PATENT DOCUMENTS

2018/0242291 A1* 8/2018 Moon .................... H04W 72/23
2019/0028192 A1* 1/2019 Tsonev .............. H04W 56/0005
(Continued)

FOREIGN PATENT DOCUMENTS

WO WO-2020236664 A1 11/2020
WO WO-2020236665 A1 11/2020

OTHER PUBLICATIONS

Hyungsik Ju and Rui Zhang, Optimal Resource Allocation in Full-Duplex Wireless-Powered Communication network, Oct. 10, 2014 IEEE Transactions of communications vol. 62, pp. 3-5 (Year: 2014).*

(Continued)

*Primary Examiner* — Michael A Keller
*Assistant Examiner* — Thao D Duong
(74) *Attorney, Agent, or Firm* — Holland & Hart LLP

(57) ABSTRACT

Methods, systems, and devices for wireless communications are described. A user equipment (UE) and a network entity may communicate according to the capability of the network entity to transmit wireless energy transfer (WET) signals on communications resources as well as scheduling information for WET signals. A network entity may transmit control signaling indicating the capability of the network entity to support transmission of WET signals in a set of uplink resources and scheduling information for a set of WET signals. The network entity may also transmit scheduling information for a set of uplink transmissions for the UE. The network entity may transmit the WET signals to an energy harvesting device. The UE may transmit the set of uplink transmissions based on the indicated capability of the network entity to support transmission of WET signals in a set of uplink resources and the scheduling information for the set of WET signals.

30 Claims, 22 Drawing Sheets

(51) Int. Cl.
*H04W 72/044* (2023.01)
*H04W 72/0446* (2023.01)
*H04W 72/51* (2023.01)

(56) References Cited

U.S. PATENT DOCUMENTS

| | | | | |
|---|---|---|---|---|
| 2019/0053265 A1* | 2/2019 | Kim | ............ | H04L 5/0044 |
| 2020/0413436 A1* | 12/2020 | Bae | ............ | H04W 72/23 |
| 2021/0298046 A1* | 9/2021 | Li | ............ | H04W 52/367 |
| 2021/0314810 A1* | 10/2021 | Kanamarlapudi | .... | H04L 1/1671 |
| 2021/0329732 A1* | 10/2021 | Zhang | ............ | H04W 72/20 |
| 2022/0225402 A1* | 7/2022 | Elkotby | ............ | H02J 50/40 |

OTHER PUBLICATIONS

International Search Report and Written Opinion—PCT/US2023/023003—ISA/EPO—Sep. 6, 2023.
Ju H., et al., "Optimal Resource Allocation in Full-Duplex Wireless-Powered Communication Network", IEEE Transactions on Communications, IEEE Service Center, Piscataway, NJ, USA, vol. 62, No. 10, Oct. 1, 2014, pp. 3528-3540, XP011561734, ISSN: 0090-6778, DOI: 10.1109/TCOMM.2014.2359878, p. 3-5, Figures 2, 3.

* cited by examiner

MANAGEMENT OF UPLINK TRANSMISSIONS AND WIRELESS ENERGY TRANSFER SIGNALS

TECHNICAL FIELD

The following relates to wireless communications, including management of uplink transmissions and wireless energy transfer signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communication system may be coupled (for example, operatively, communicatively, functionally, electronically, and/or electrically) to each other.

SUMMARY

The described techniques relate to improved methods, systems, devices, and apparatuses that support management of uplink transmissions and wireless energy transfer signals. For example, the described techniques provide for signaling, from a network entity to user equipments (UEs) communicating with the network entity, of a capability of the network entity to transmit wireless energy transfer (WET) signals on communications resources as well as scheduling information for WET signals. A user equipment (UE) and a network entity may communicate according to the capability of the network entity to transmit WET signals on communications resources as well as scheduling information for WET signals. For example, a network entity may transmit control signaling indicating to the UE the capability of the network entity to support transmission of WET signals in a set of uplink resources and scheduling information for a set of WET signals. The network entity may also transmit scheduling information for a set of uplink transmissions for the UE. The network entity may transmit the WET signals to an energy harvesting device. The UE may transmit the set of uplink transmissions based on the indicated capability of the network entity to support transmission of WET signals in a set of uplink resources and the scheduling information for the set of WET signals.

A method for wireless communications is described. The method may include receiving first control signaling indicating a capability of a network entity to support transmission of energy transfer signals in a set of uplink resources configured for a user equipment (UE) and first scheduling information for a set of energy transfer signals by the network entity, receiving second control signaling indicating second scheduling information for a set of uplink transmissions, and performing one or more uplink transmissions of the set of uplink transmissions based on the capability of the network entity to support transmission of energy transfer signals in the set of uplink resources configured for the UE, the first scheduling information, and the second scheduling information.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the UE to receive first control signaling indicating a capability of a network entity to support transmission of energy transfer signals in a set of uplink resources configured for a UE and first scheduling information for a set of energy transfer signals by the network entity, receive second control signaling indicating second scheduling information for a set of uplink transmissions, and perform one or more uplink transmissions of the set of uplink transmissions based on the capability of the network entity to support transmission of energy transfer signals in the set of uplink resources configured for the UE, the first scheduling information, and the second scheduling information.

Another apparatus for wireless communications at a UE is described. The apparatus may include means for receiving first control signaling indicating a capability of a network entity to support transmission of energy transfer signals in a set of uplink resources configured for a UE and first scheduling information for a set of energy transfer signals by the network entity, means for receiving second control signaling indicating second scheduling information for a set of uplink transmissions, and means for performing one or more uplink transmissions of the set of uplink transmissions based on the capability of the network entity to support transmission of energy transfer signals in the set of uplink resources configured for the UE, the first scheduling information, and the second scheduling information.

A non-transitory computer-readable medium storing code for wireless communications at a UE is described. The code may include instructions executable by a processor to receive first control signaling indicating a capability of a network entity to support transmission of energy transfer signals in a set of uplink resources configured for a UE and first scheduling information for a set of energy transfer signals by the network entity, receive second control signaling indicating second scheduling information for a set of uplink transmissions, and perform one or more uplink transmissions of the set of uplink transmissions based on the capability of the network entity to support transmission of energy transfer signals in the set of uplink resources configured for the UE, the first scheduling information, and the second scheduling information.

Some examples of the method, apparatuses, and non-transitory computer-readable medium described herein may further include operations, features, means, or instructions for receiving, with the first control signaling, an indication that the network entity supports half duplex transmission of energy transfer signals and reception of uplink transmissions in the set of uplink resources and canceling a subset of uplink transmissions of the set of uplink transmissions according to a scheduling overlap between the subset of uplink transmissions and one or more energy transfer signals of the set of energy transfer signals.

In some examples of the method, apparatuses, and non-transitory computer-readable medium described herein, the one or more uplink transmissions include a second subset of uplink transmissions of the set of uplink transmissions, the second subset of uplink transmissions including each uplink transmission of the set of uplink transmissions absent from the subset of uplink transmissions of the set of uplink transmissions.

In some examples of the method, apparatuses, and non-transitory computer-readable medium described herein, receiving the first control signaling indicating the capability may include operations, features, means, or instructions for receiving an indication that the network entity supports full duplex transmission of energy transfer signals and reception of uplink transmissions in the set of uplink resources, and where the one or more uplink transmissions includes an entirety of the set of uplink transmissions.

In some examples of the method, apparatuses, and non-transitory computer-readable medium described herein, the set of uplink resources includes one of uplink slots within a time division duplexing carrier or an uplink band of a frequency division duplexing carrier.

In some examples of the method, apparatuses, and non-transitory computer-readable medium described herein, receiving the first control signaling indicating the capability may include operations, features, means, or instructions for receiving an indication that the network entity supports transmission of an energy transfer signal and reception of an uplink transmission in a subset of uplink resources of the set of uplink resources.

Some examples of the method, apparatuses, and non-transitory computer-readable medium described herein may further include operations, features, means, or instructions for canceling a subset of uplink transmissions of the set of uplink transmissions according to a scheduling overlap between the subset of uplink transmissions and one or more energy transfer signals of the set of energy transfer signals in one or more uplink resources of the set of uplink resources absent from the subset of uplink resources.

In some examples of the method, apparatuses, and non-transitory computer-readable medium described herein, the one or more uplink transmissions include a second subset of uplink transmissions of the set of uplink transmissions, the second subset of uplink transmissions including each uplink transmission of the set of uplink transmissions absent from the subset of uplink transmissions of the set of uplink transmissions.

In some examples of the method, apparatuses, and non-transitory computer-readable medium described herein, the set of uplink resources includes a carrier band and the subset of uplink resources includes a subband of the carrier band.

In some examples of the method, apparatuses, and non-transitory computer-readable medium described herein, receiving the first control signaling indicating the capability may include operations, features, means, or instructions for receiving an indication that the network entity supports transmission of energy transfer signals in a first carrier band and reception of uplink transmissions in a second carrier band, where the one or more uplink transmissions includes an entirety of the set of uplink transmissions within the second carrier band.

In some examples of the method, apparatuses, and non-transitory computer-readable medium described herein, receiving the first control signaling indicating the capability may include operations, features, means, or instructions for receiving an indication that the network entity does not support transmission of energy transfer signals in the set of uplink resources, and where the one or more uplink transmissions includes an entirety of the set of uplink transmissions.

Some examples of the method, apparatuses, and non-transitory computer-readable medium described herein may further include operations, features, means, or instructions for receiving, with the first control signaling, an indication of a second capability of the network entity to support transmission of energy transfer signals in a set of downlink resources configured for the UE, receiving, from the network entity, third control signaling indicating third scheduling information for a set of downlink transmissions, and receiving, from the network entity, one or more downlink transmissions of the set of downlink transmissions based on the second capability, the first scheduling information, and the third scheduling information.

A method for wireless communications at a network entity is described. The method may include transmitting first control signaling indicating a capability of the network entity to support transmission energy transfer signals in a set of uplink resources configured for a UE and first scheduling information for a set of energy transfer signals, transmitting second control signaling indicating second scheduling information for a set of uplink transmissions by the UE, transmitting the set of energy transfer signals, and receiving one or more uplink transmissions of the set of uplink transmissions based on the capability of the network entity to support transmission of energy transfer signals in the set of uplink resources configured for the UE, the first scheduling information, and the second scheduling information.

An apparatus for wireless communications at a network entity is described. The apparatus may include a at least one processor, memory coupled (e.g., operatively, communicatively, functionally, electronically, or electrically) to the at least one processor, and instructions stored in the memory. The instructions may be executable by the at least one processor to cause the network entity to transmit first control signaling indicating a capability of the network entity to support transmission energy transfer signals in a set of uplink resources configured for a UE and first scheduling information for a set of energy transfer signals, transmit second control signaling indicating second scheduling information for a set of uplink transmissions by the UE, transmit the set of energy transfer signals, and receive one or more uplink transmissions of the set of uplink transmissions based on the capability of the network entity to support transmission of energy transfer signals in the set of uplink resources configured for the UE, the first scheduling information, and the second scheduling information.

Another apparatus for wireless communications at a network entity is described. The apparatus may include means for transmitting first control signaling indicating a capability of the network entity to support transmission energy transfer signals in a set of uplink resources configured for a UE and first scheduling information for a set of energy transfer signals, means for transmitting second control signaling indicating second scheduling information for a set of uplink transmissions by the UE, means for transmitting the set of energy transfer signals, and means for receiving one or more uplink transmissions of the set of uplink transmissions based on the capability of the network entity to support transmission of energy transfer signals in the set of uplink resources configured for the UE, the first scheduling information, and the second scheduling information.

A non-transitory computer-readable medium storing code for wireless communications at a network entity is described. The code may include instructions executable by a processor to transmit first control signaling indicating a capability of the network entity to support transmission energy transfer signals in a set of uplink resources configured for a UE and first scheduling information for a set of energy transfer signals, transmit second control signaling indicating second scheduling information for a set of uplink transmissions by the UE, transmit the set of energy transfer signals, and receive one or more uplink transmissions of the set of uplink transmissions based on the capability of the network entity to support transmission of energy transfer signals in the set of uplink resources configured for the UE, the first scheduling information, and the second scheduling information.

Some examples of the method, apparatuses, and non-transitory computer-readable medium described herein may further include operations, features, means, or instructions for transmitting, with the first control signaling, an indication that the network entity supports half duplex transmission of energy transfer signals and reception of uplink transmissions in the set of uplink resources.

In some examples of the method, apparatuses, and non-transitory computer-readable medium described herein, a first subset of uplink transmissions of the set of uplink transmissions may be subject to a scheduling overlap between the first subset of uplink transmissions and one or more energy transfer signals of the set of energy transfer signals and the one or more uplink transmissions include a second subset of uplink transmissions of the set of uplink transmissions, the second subset of uplink transmissions including each uplink transmission of the set of uplink transmissions absent from the first subset of uplink transmissions of the set of uplink transmissions.

In some examples of the method, apparatuses, and non-transitory computer-readable medium described herein, transmitting the first control signaling indicating the capability may include operations, features, means, or instructions for transmitting an indication that the network entity supports full duplex transmission of energy transfer signals and reception of uplink transmissions in the set of uplink resources, and where the one or more uplink transmissions includes an entirety of the set of uplink transmissions.

In some examples of the method, apparatuses, and non-transitory computer-readable medium described herein, the set of uplink resources includes one of uplink slots within a time division duplexing carrier or an uplink band of a frequency division duplexing carrier.

In some examples of the method, apparatuses, and non-transitory computer-readable medium described herein, transmitting the first control signaling indicating the capability may include operations, features, means, or instructions for transmitting an indication that the network entity supports transmission of an energy transfer signal and reception of an uplink transmission in a subset of uplink resources of the set of uplink resources.

In some examples of the method, apparatuses, and non-transitory computer-readable medium described herein, a first subset of uplink transmissions of the set of uplink transmissions may be subject to a scheduling overlap between the first subset of uplink transmissions and one or more energy transfer signals of the set of energy transfer signals in one or more uplink resources of the set of uplink resources absent from the subset of uplink resources and the one or more uplink transmissions include a second subset of uplink transmissions of the set of uplink transmissions, the second subset of uplink transmissions including each uplink transmission of the set of uplink transmissions absent from the first subset of uplink transmissions of the set of uplink transmissions.

In some examples of the method, apparatuses, and non-transitory computer-readable medium described herein, the set of uplink resources includes a carrier band and the subset of uplink resources includes a subband of the carrier band.

In some examples of the method, apparatuses, and non-transitory computer-readable medium described herein, transmitting the first control signaling indicating the capability may include operations, features, means, or instructions for transmitting an indication that the network entity supports transmission of energy transfer signals in a first carrier band and reception of uplink transmissions in a second carrier band, where the one or more uplink transmissions includes an entirety of the set of uplink transmissions within the second carrier band.

In some examples of the method, apparatuses, and non-transitory computer-readable medium described herein, transmitting the first control signaling indicating the capability may include operations, features, means, or instructions for transmitting an indication that the network entity does not support transmission of energy transfer signals in the set of uplink resources, and where the one or more uplink transmissions includes an entirety of the set of uplink transmissions.

Some examples of the method, apparatuses, and non-transitory computer-readable medium described herein may further include operations, features, means, or instructions for transmitting, with the first control signaling, an indication of a second capability of the network entity to support transmission of energy transfer signals in a set of downlink resources configured for the UE, transmitting third control signaling indicating third scheduling information for a set of downlink transmissions, and performing one or more downlink transmissions of the set of downlink transmissions based on the second capability, the first scheduling information, and the third scheduling information.

DETAILED DESCRIPTION

Figure 1:
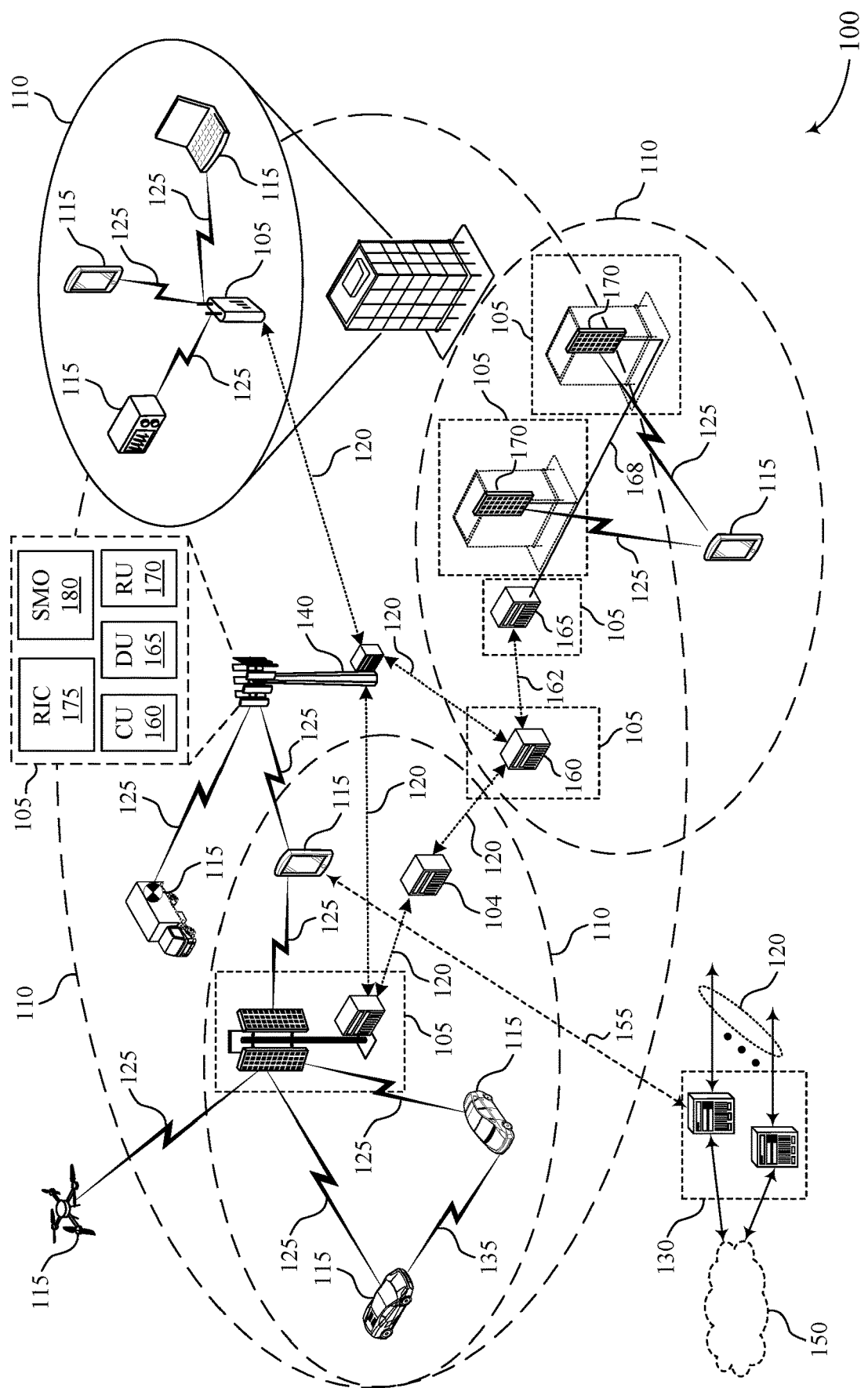
FIG. 1 illustrates an example of a wireless communications system that supports management of uplink transmissions and wireless energy transfer signals in accordance with one or more aspects of the present disclosure.

Some devices, such as user equipments (UEs), Internet of things (IoT) devices, or radio frequency identifier (RFID) devices, may be configured to perform energy harvesting, meaning that the device may harvest energy from the environment (e.g., solar, heat, and radio frequency (RF) radiation) to power the operation and communications of the device. In particular, some devices may harvest energy from RF radiation. For example, some energy harvesting devices may include dedicated receiver architecture (e.g., a dedicated antenna and energy harvesting circuitry) for energy harvesting. A network entity, such as one or more components of a base station, may be configured to transmit wireless energy transfer (WET) signals from which energy harvesting devices may capture energy. In some systems, the power level of RF signals used for energy harvesting may be higher than the power level of RF signals used for communications. As one example, energy harvesting signals may be in the range of −10 to 20 dBm while communications signals may be decoded at −100 dBm. Accordingly, the coverage area for WET signals may be relatively small compared to the coverage area for communications. Network entities may transmit WET signals using resources that would otherwise be used for communications. Currently, there is no signaling indicating to connected devices (e.g., UEs) which resources are used to transmit WET signals.

The present disclosure relates to signaling, from a network entity to UEs communicating with the network entity, of a capability of the network entity to transmit WET signals on communications resources as well as scheduling information for WET signals. The UE and the network entity may communicate according to the capability of the network entity to transmit WET signals on communications resources as well as scheduling information for WET signals. For example, a network entity may transmit control signaling indicating to the UE the capability of the network entity to support transmission of WET signals in a set of uplink resources and scheduling information for a set of WET signals. The network entity may also transmit scheduling information for a set of uplink transmissions for the UE. The network entity may transmit the WET signals to an energy harvesting device. The UE may transmit the set of uplink transmissions based on the indicated capability of the network entity to support transmission of WET signals in a set of uplink resources and the scheduling information for the set of WET signals.

For example, if the network entity indicates that the network entity is capable of full duplex on an uplink resource for WET signals and uplink transmissions, the UE may transmit the entire set of uplink transmissions. As another example, if the network entity indicates that the network entity is not capable of transmitting WET signals on uplink resources, the UE may transmit the entire set of uplink transmissions. As another example, if the network entity indicates that the network entity is capable of half duplex on an uplink resource for WET signals and uplink transmissions (e.g., the network entity may either transmit a WET signal or receive an uplink transmission on a same uplink resource), then the UE may either not expect to receive scheduling information for an uplink transmission in a same resource as a scheduled WET signal or the UE may cancel or drop uplink transmissions that are scheduled in a same resource as a WET signal. As another example, if the network entity indicates that the network entity is capable of full duplex on an subset of uplink resources for WET signals and uplink transmissions (e.g., a subset of slots or a subband of a carrier band), the UE may transmit the scheduled uplink transmissions within the subset of uplink resources and cancel or drop scheduled uplink transmissions outside the subset of uplink resources that are scheduled in a same resource as a WET signal. Accordingly, the described techniques enable cooperation between the network entity and the UE to deliver WET signals to an energy harvesting device using communications resources configured for the UE.

Aspects of the disclosure are initially described in the context of wireless communications systems. Aspects of the disclosure are further illustrated by and described with reference to resource diagrams and process flows. Aspects of the disclosure are further illustrated by and described with reference to apparatus diagrams, system diagrams, and flowcharts that relate to management of uplink transmissions and wireless energy transfer signals.

FIG. 1 illustrates an example of a wireless communications system 100 that supports management of uplink transmissions and wireless energy transfer signals in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support management of uplink transmissions and wireless energy transfer signals as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Some devices (e.g., UEs 115, IoT devices, or RFID devices), may be configured to perform energy harvesting. In particular, some energy harvesting devices may harvest energy from RF radiation. For example, some energy harvesting devices may include dedicated receiver architecture (e.g., a dedicated antenna and energy harvesting circuitry).

RFID is a rapidly growing technology that may impact many industries due to the potential for applications such as inventory and asset management, IoT, sustainable sensor networks (e.g., in factories), agriculture, and smart homes. RFID technology includes small transponders, or "tags," which emit an information-bearing signal upon reception of a signal at the tag. RFID tags may be operated with no battery or with a low operating expense batter, may be associated with little maintenance, and long life. Passive RFID devices may harvest energy over the air and power the transmission/reception circuitry, where the transmitted signal may typically be backscatter modulated. Semi-passive or active RFID tags may be associated with higher costs as compared to passive RFID tags.

Wireless communications systems, such as wireless communications system 100, may include industrial verticals besides eMBB. For example, URLLC, MTC, 5G and beyond may be expanded to support passive IoT. For example, some communications systems, such as wireless communications system 100, may manage passive IoT devices. For example, a network entity 105 may: read or write information stored on passive IoT devices; provide energy to passive IoT devices; reflect information bearing signals from a passive IoT; and/or read the reflected signal by a passive IoT to decode information transmitted by the IoT.

A network entity 105 may be configured to transmit WET signals from which energy harvesting devices may capture energy. A network entity 105 may signal, to UEs 115 communicating with the network entity 105, a capability of the network entity 105 to transmit WET signals on communications resources as well as scheduling information for WET signals. The UE 115 and the network entity 105 may communicate according to the capability of the network entity 105 to transmit WET signals on communications resources as well as scheduling information for WET signals. For example, a network entity 105 may transmit control signaling indicating to the UE 115 the capability of the network entity 105 to support transmission of WET signals in a set of uplink resources and scheduling information for a set of WET signals. The network entity 105 may also transmit scheduling information for a set of uplink transmissions for the UE 115. The network entity 105 may transmit the WET signals to an energy harvesting device. The UE 115 may transmit the set of uplink transmissions based on the indicated capability of the network entity 105 to support transmission of WET signals in a set of uplink resources and the scheduling information for the set of WET signals.

For example, if the network entity 105 indicates that the network entity 105 is capable of full duplex on an uplink resource for WET signals and uplink transmissions, the UE 115 may transmit the entire set of uplink transmissions. As another example, if the network entity 105 indicates that the network entity 105 is not capable of transmitting WET signals on uplink resources, the UE 115 may transmit the entire set of uplink transmissions.

As another example, if the network entity 105 indicates that the network entity 105 is capable of half duplex on an uplink resource for WET signals and uplink transmissions (e.g., the network entity 105 may either transmit a WET signal or receive an uplink transmission on a same uplink resource), then the UE 115 may either not expect to receive scheduling information for an uplink transmission in a same resource as a scheduled WET signal or the UE 115 may cancel or drop uplink transmissions that are scheduled in a same resource as a WET signal.

As another example, if the network entity 105 indicates that the network entity 105 is capable of full duplex on an subset of uplink resources for WET signals and uplink transmissions (e.g., a subset of slots or a subband of a carrier band), the UE 115 may transmit the scheduled uplink transmissions within the subset of uplink resources and cancel or drop scheduled uplink transmissions outside the subset of uplink resources that are scheduled in a same resource as a WET signal.

Accordingly, the network entity 105 and the UE may cooperate to manage coverage enhancement for WET to an energy harvesting device. For example, the network entity 105 and the UE 115 may cooperate to configure communications resources for delivery of WET signals to an energy harvesting device using communications resources configured for the UE 115.

Figure 2:
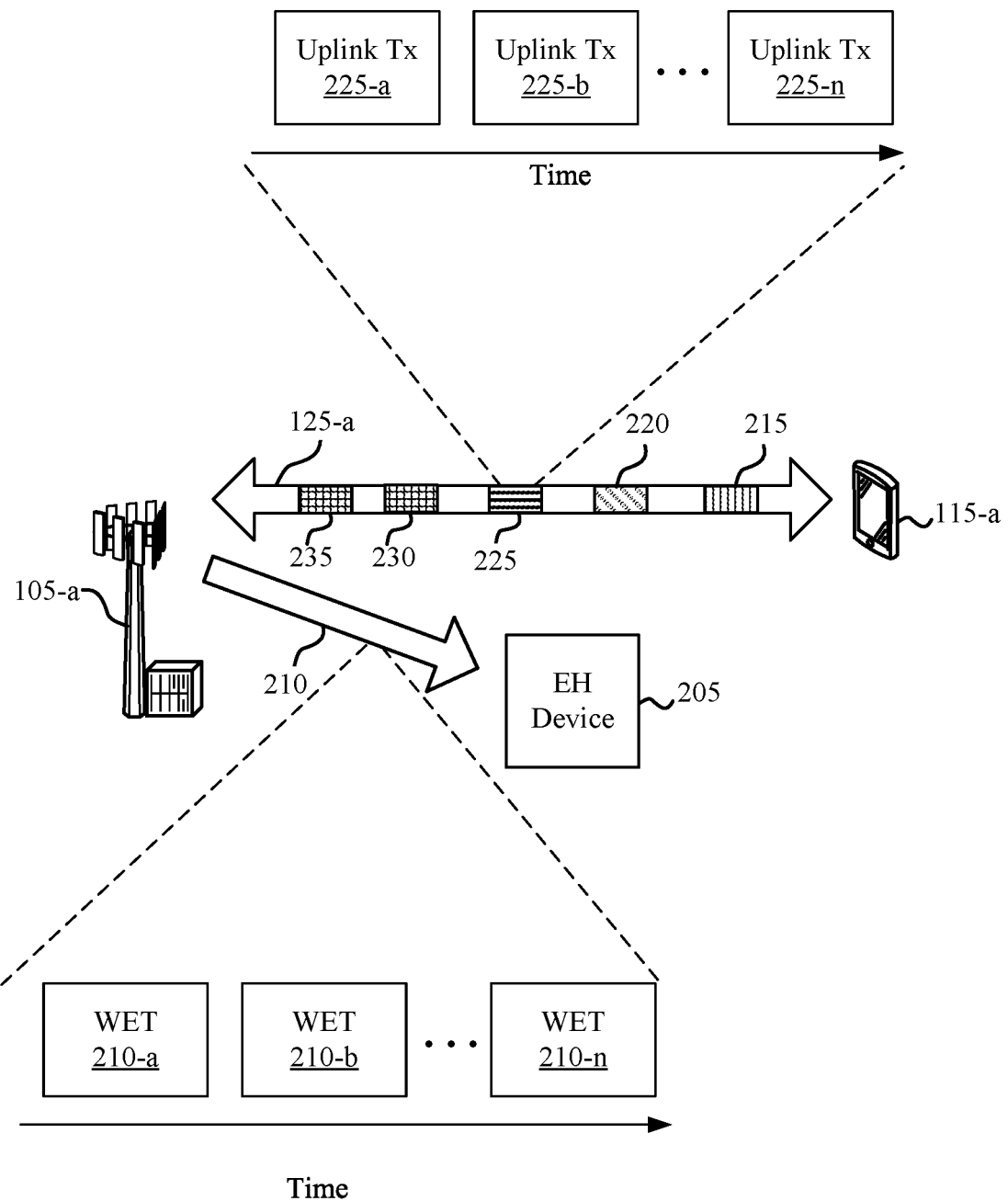
FIG. 2 illustrates an example of a wireless communications system that supports management of uplink transmissions and wireless energy transfer signals in accordance with one or more aspects of the present disclosure.

FIG. 2 illustrates an example of a wireless communications system 200 that supports management of uplink transmissions and wireless energy transfer signals in accordance with one or more aspects of the present disclosure. In some examples, the wireless communications system 200 may implement aspects of wireless communications system 100. The wireless communications system 200 may include a UE 115-a, which may be an example of a UE 115 as described herein. The wireless communications system 200 may include a network entity 105-a, which may be an example of a network entity 105 as described herein.

The UE 115-a may communicate with the network entity 105-a using a communication link 125-a, which may be examples of NR or LTE links between the UE 115-a and the network entity 105-a. The communication link 125-a may include a bi-directional link that enables both uplink and downlink communication. For example, the UE 115-a may transmit uplink transmissions, such as uplink control signals or uplink data signals, to the network entity 105-a using the communication link 125-a and the network entity 105-a may transmit downlink transmissions, such as downlink control signals or downlink data signals, to the UE 115-a using the communication link 125-a.

The energy harvesting device 205 may be a device configured to harvest energy from RF radiation. For example, the energy harvesting device 205 may be an RFID tag, a IoT device, or an energy harvesting UE. To harvest RF energy, the energy harvesting device 205 may include RF energy harvesting circuitry. RF power harvesting may be non-linear with input power at the power harvesting circuitry (e.g., due to diodes). Typical input power may be larger than −20 decibels. In some examples, −10 decibels may be associated with turning on the power harvesting circuitry. RF energy harvesting may be more efficient at lower frequencies due to diode junction capacitance and resistance (e.g., caused by frequency-selective conversion efficiency).

RFID may be associated with short-range signaling (e.g., less than 10 meters) for passive IoT, for example due to insufficient link budget issues. For range considerations. the power link (e.g., the downlink signal (e.g., reader to tag)), may typically be a bottleneck wireless link. Typical RFID power harvesting circuitry may demand a high input power (e.g., −13 decibels). In some examples, lower input power at −20 decibels or below may not assure satisfactory cost and conversion efficiency (e.g., below 1% efficiency). Reflections by multi-path may also result in fading to the energy signal and range degradation.

The network entity 105-a may be configured to transmit both energy transfer signals 210 and communications signals (e.g., uplink and downlink signals with the UE 115-a via the communication link 125-a). As described herein, power harvesting circuitry at an energy harvesting device 205 may demand high input power from energy transfer signals 210 (e.g., −10 decibels to 20 decibels). Communications signals, meanwhile, may be decoded at comparatively lower input powers (e.g., −100 decibels). Accordingly a coverage area for energy transfer signals 210 transmitted by a network entity 105-a may be small compared to a coverage area for communications signals transmitted by a network entity 105-a. In some cases, the network entity 105-a may be configured to transmit energy transfer signals during uplink symbols in a TDD carrier or in an uplink band in an FDD carrier. The network entity 105-a and the UE 115-a may cooperate to manage coverage enhancement for WET to the energy harvesting device 205.

For example, the network entity 105-a may transmit first control signaling 215 to the UE 115-a, the first control signaling 215 indicating a capability of a network entity 105-a to support transmission of energy transfer signals in a set of uplink resources configured for the UE 115-a and first scheduling information for a set of energy transfer signals 210 (e.g., energy transfer signal 210-a, energy transfer signal 210-b . . . and energy transfer signal 210-n) by the network entity 105-a. In some examples, the network entity 105-a may broadcast the indication of the capability of a network entity 105-a to support transmission of energy transfer signals 210 in the set of uplink resources, for example in a synchronization signal block (SSB) or a system information block (SIB).

In some examples, the control signaling 215 may include multiple transmissions (e.g., a first transmission may include an indication of a capability of a network entity 105-a to support transmission of energy transfer signals in a set of uplink resources configured for the UE 115-a and a second transmission may include the scheduling information for the set of energy transfer signals 210). In some examples, the indication of the capability of a network entity 105-a to support transmission of energy transfer signals 210 in the set of uplink resources may indicate whether the network entity 105-a supports full duplexing or half duplexing, the beamforming capability of the network entity 105-a, the number of antennas at the network entity 105-a associated with the energy transfer signals, a maximum deliverable energy in an energy transfer signal 210, and/or a maximum energy transfer duration for energy transfer signal 210.

The network entity 105-a may transfer second control signaling 220 to the UE 115-a, the second control signaling 220 indicating scheduling information for a set of uplink transmissions 225 (e.g., uplink transmission 225-a, uplink transmission 225-b . . . and uplink transmission 225-n) for the UE 115-a. The network entity 105-a may transmit the set of energy transfer signals 210, which the energy harvesting device 205 may use to harvest energy. The UE 115-a may perform one or more uplink transmissions (e.g., one or more of uplink transmission 225-a, uplink transmission 225-b . . . and uplink transmission 225-n) of the set of uplink transmissions 225 based on the indicated capability of the network entity 105-a to support transmission of energy transfer signals 210 in the set of uplink resources configured for the UE 115-a, the scheduling information for the set of energy transfer signals 210, and the scheduling information for the set of uplink transmissions 225.

In some cases, the UE 115-a may receive, with the first control signaling 215, an indication that the network entity 105-a supports half duplex transmission of energy transfer signals 210 and reception of uplink transmissions 225 in the set of uplink resources. For example, the network entity 105-a may indicate that the network entity 105-a either supports receiving an uplink transmission 225 (e.g., a sounding reference signal (SRS), PUCCH, or PUSCH), or transmitting an energy transfer signal 210 in a given uplink resource. In some cases, the UE 115-a may not expect to receive scheduling for uplink transmissions 225 in an uplink resource indicated by the control signaling 215 as being scheduled for an energy transfer signal 210. In some cases, the UE 115-*a* may cancel a subset of the uplink transmissions 225 (e.g., one or more of uplink transmission 225-*a*, uplink transmission 225-*b* . . . and uplink transmission 225-*n*) according to a scheduling overlap between the subset of uplink transmissions and one or more energy transfer signals (e.g., energy transfer signal 210-*a*, energy transfer signal 210-*b* . . . and energy transfer signal 210-*n*) of the set of energy transfer signals 210. The UE 115-*a* may transmit the one or more uplink transmissions (e.g., one or more of uplink transmission 225-*a*, uplink transmission 225-*b* . . . and uplink transmission 225-*n*) that were not canceled. For example, the UE 115-*a* may cancel uplink transmission 225-*b* if the UE 115-*a* determines that uplink transmission 225-*b* overlaps with energy transfer signal 210-*b* and the network entity 105-*a* indicated via the control signaling 215 that the network entity 105-*a* supports half duplex transmission of energy transfer signals 210 and reception of uplink transmissions 225 in the set of uplink resources. The UE 115-*a* may transmit the remaining uplink transmissions (e.g., uplink transmission 225-*a* through uplink transmission 225-*n* except for uplink transmission 225-*b*).

In some cases, the UE 115-*a* may receive, with the first control signaling 215, an indication that the network entity 105-*a* supports full duplex transmission of energy transfer signals 210 and reception of uplink transmissions 225 in the set of uplink resources. For example, the network entity 105-*a* may indicate that the network entity 105-*a* supports simultaneous transmission of an energy transfer signal 210 and an uplink transmission 225 in a given uplink resource. In such cases, the UE 115-*a* may transmit the entirety of the set of uplink transmissions (e.g., the UE 115-*a* may transmit each of uplink transmission 225-*a*, uplink transmission 225-*b* . . . and uplink transmission 225-*n*). In some cases, the set of uplink resources may include uplink slots within a TDD carrier or an uplink band of an FDD carrier. In some examples, the network entity 105-*a* may broadcast the indication of the capability of a network entity 105-*a* to support transmission of energy transfer signals 210 in the set of uplink resources in a per band or per carrier manner to UEs 115 including the UE 115-*a*.

In some cases, the UE 115-*a* may receive, with the first control signaling 215, an indication that the network entity 105-*a* supports full duplex or half duplex of an energy transfer signal 210 and reception of an uplink transmission 225 in a subset of uplink resources of the set of uplink resources. For example, for WET in a TDD band, the network entity 105-*a* may indicate that the network entity 105-*a* supports full duplex in a subband or that the network entity 105-*a* supports half duplex within a subband. The network entity 105-*a* may signal the defined subband, for example in the control signaling 215. In some cases, the subband may be discontinuous within a band (or carrier (e.g., a BWP for uplink transmissions and a BWP for WET may be within a same carrier or band, but may not be continuous). In some cases, the subband may be continuous within a band. In some cases, a subband may refer to given uplink resources (e.g., given uplink symbols or slots) in which the network entity 105-*a* is capable of full duplexing of energy transfer signals 210 and uplink transmissions 225.

In some cases, the UE 115-*a* may not expect to receive scheduling for uplink transmissions 225 in a given uplink resource outside of the subset of uplink resources where the network entity 105-*a* indicated that the network entity 105-*a* supports full duplex if the control signaling 215 indicated the given uplink resource as being scheduled for an energy transfer signal 210. In some cases, the UE 115-*a* may cancel a subset of uplink transmissions (e.g., one or more of uplink transmission 225-*a*, uplink transmission 225-*b* . . . and uplink transmission 225-*n*) of the set of uplink transmissions 225 according to a scheduling overlap between the subset of uplink transmissions (e.g., energy transfer signal 210-*a*, energy transfer signal 210-*b* . . . and energy transfer signal 210-*n*) and the set of energy transfer signals 210 in one or more uplink resources of the set of uplink resources outside the subset of uplink resources where the network entity 105-*a* indicated that the network entity 105-*a* supports full duplex. The UE 115-*a* may transmit the one or more uplink transmissions (e.g., one or more of uplink transmission 225-*a*, uplink transmission 225-*b* . . . and uplink transmission 225-*n*) that were not canceled.

For example, the UE 115-*a* may cancel uplink transmission 225-*b* if the UE 115-*a* determines that uplink transmission 225-*b* overlaps with energy transfer signal 210-*b* and the network entity 105-*a* indicated via the control signaling 215 that the network entity 105-*a* does not support full duplex transmission of energy transfer signals 210 and reception of uplink transmissions 225 in the subset of uplink resources in which the uplink transmission 225-*b* is scheduled. The UE 115-*a* may transmit the remaining uplink transmissions (e.g., uplink transmission 225-*a* through uplink transmission 225-*n* except for uplink transmission 225-*b*).

In some cases, the UE 115-*a* may receive, with the first control signaling 215, an indication that the network entity 105-*a* supports transmission of energy transfer signals 210 in a first carrier band and reception of uplink transmissions 225 in a second carrier band. For example, in an FDD band, the network entity 105-*a* may transmit energy transfer signals in one carrier band and may receive uplink transmissions in another carrier band. In such cases, the UE 115-*a* may transmit the entirety of the set of uplink transmissions (e.g., the UE 115-*a* may transmit each of uplink transmission 225-*a*, uplink transmission 225-*b* . . . and uplink transmission 225-*n*).

In some cases, the UE 115-*a* may receive, with the first control signaling 215, an indication that the network entity 105-*a* does not support transmission of energy transfer signals 210 in the set of uplink resources. For example, for a TDD carrier, the network entity 105-*a* may indicate that the network entity 105-*a* is not capable of transmitting energy transfer signals 210 or that the network entity 105-*a* only supports transmission of energy transfer signals 210 in downlink or flexible resources. In such cases, the UE 115-*a* may transmit the entirety of the set of uplink transmissions (e.g., the UE 115-*a* may transmit each of uplink transmission 225-*a*, uplink transmission 225-*b* . . . and uplink transmission 225-*n*), and the network entity 105-*a* may not transmit the set of energy transfer signals 210 in the set of uplink resources.

In some cases, the UE 115-*a* may receive, with the first control signaling 215, an indication of a capability of the network entity 105-*a* to support transmission of energy transfer signals 210 in a set of downlink resources configured for the UE 115-*a*. In some examples, the first control signaling 215 may indicate the capability of the network entity 105-*a* to support transmission of energy transfer signals 210 in a set of downlink resources and may not indicate the capability of the network entity 105-*a* to support transmission of energy transfer signals 210 in a set of uplink resources. In some examples, the first control signaling 215 may indicate both the capability of the network entity 105-*a* to support transmission of energy transfer signals 210 in a set of downlink resources and the capability of the network entity 105-a to support transmission of energy transfer signals 210 in a set of downlink resources.

The UE 115-a may receive, from the network entity 105-a, third control signaling 230 indicating scheduling information for a set of downlink transmissions 235. The UE 115-a and the network entity 105-a may resolve scheduling overlaps between the set of downlink transmissions 235 and the set of energy transfer signals 210 similarly to the described resolution between energy transfer signals 210 and uplink transmissions 225. For example, the UE 115-a may receive, from the network entity 105-a, one or more downlink transmissions of the set of downlink transmissions 235 based on the indicated capability of the network entity 105-a, the scheduling information for the set of energy transfer signals 210, and the scheduling information for the set of downlink transmissions 235. In some cases, if the network entity 105-a indicates that the network entity 105-a is not capable of full duplex for downlink transmissions 235 and energy transfer signals 210, the UE 115-a may not except a downlink transmission 235 to overlap with an energy transfer signal 210.

Figure 3:
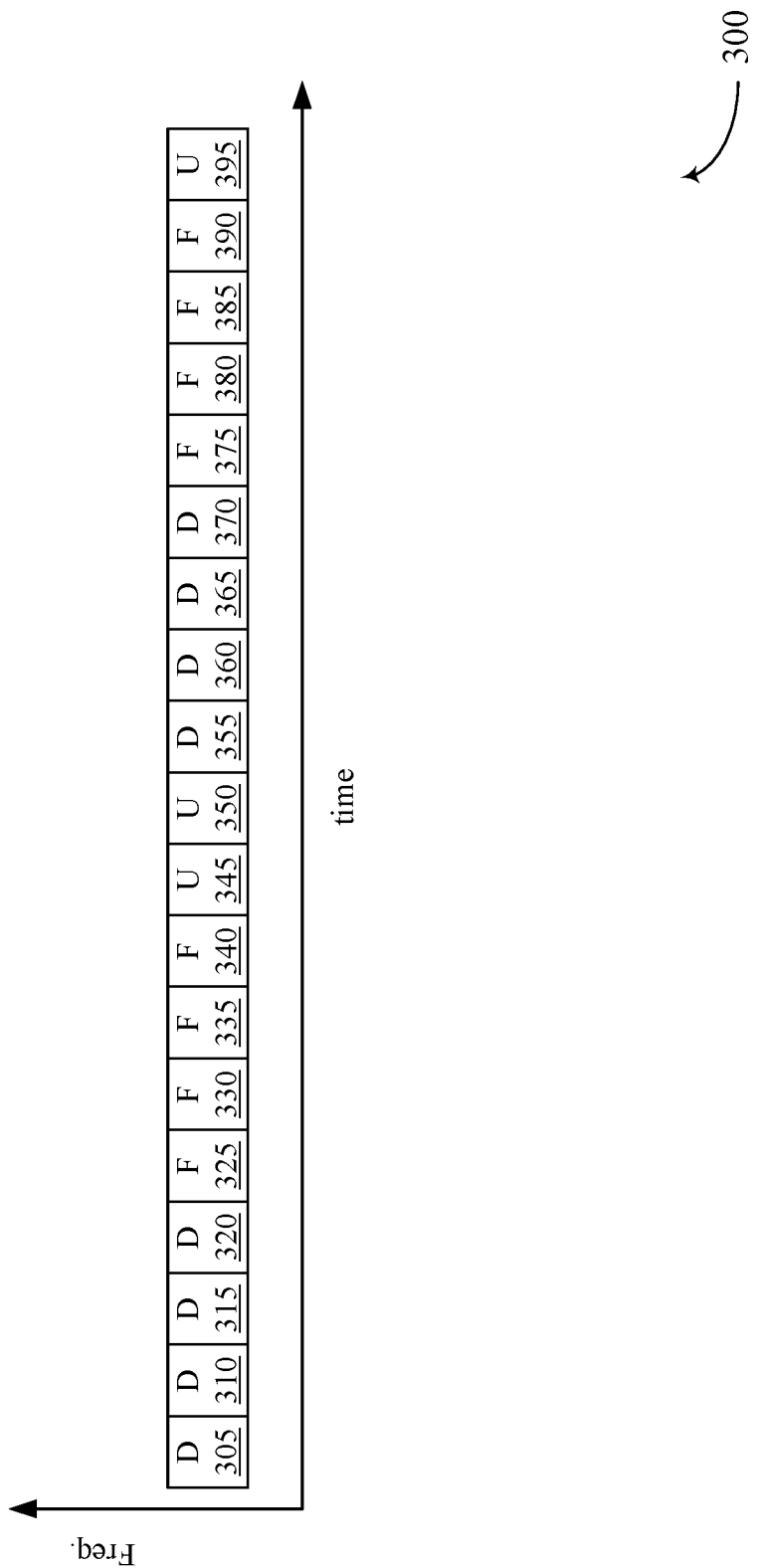
FIG. 3 illustrates an example of a resource diagram that supports management of uplink transmissions and wireless energy transfer signals in accordance with one or more aspects of the present disclosure.

FIG. 3 illustrates an example of a resource diagram 300 that supports management of uplink transmissions and wireless energy transfer signals in accordance with one or more aspects of the present disclosure. In some examples, the resource diagram 300 may implement aspects of wireless communications systems 100 or 200.

The resource diagram 300 illustrates an example TDD band including a number of communication resources (e.g., slots or symbols). For example, the TDD resources may include a downlink resource 305, a downlink resource 310, a downlink resource 315, a downlink resource 320, a flexible resource 325, a flexible resource 330, a flexible resource 335, a flexible resource 340, an uplink resource 345, an uplink resource 350, a downlink resource 355, a downlink resource 360, a downlink resource 365, a downlink resource 370, a flexible resource 375, a flexible resource 380, a flexible resource 385, a flexible resource 390, and an uplink resource 395. Downlink resources may be used by a network entity 105 for example, for physical downlink control channel (PDCCH) transmissions or physical downlink shared channel (PDSCH) transmissions. Uplink resources may be used by a UE 115 for example, for physical uplink control channel (PUCCH) transmissions or physical uplink shared channel (PUSCH) transmissions. Flexible resources may be scheduled dynamically by a network entity 105 for either downlink or uplink subject to signaling from the network entity 105.

In some cases, WET may be deployed in an TDD band, and an energy transfer signal may coexist with communications signals in the TDD band (e.g., transmitted in one of the communications resources). For example, for WET deployed in a TDD band, a network entity 105 may transmit energy transfer signals in uplink resources (e.g., uplink resource 345, uplink resource 350, or uplink resource 395). In some cases, the network entity 105 may schedule energy charging for an energy harvesting device 205 in uplink resources (e.g., uplink resource 345, uplink resource 350, or uplink resource 395) in a semi-static or a dynamic manner. A network entity 105 and a UE 115 may cooperate to deliver charging energy (e.g., energy transfer signals) to an energy harvesting device 205, as described herein. For example, in some cases, a UE 115 may expect cancellation of one or more scheduled uplink transmissions in given uplink resources if an energy transfer signal overlaps with the one or more scheduled uplink transmissions.

Figure 4:
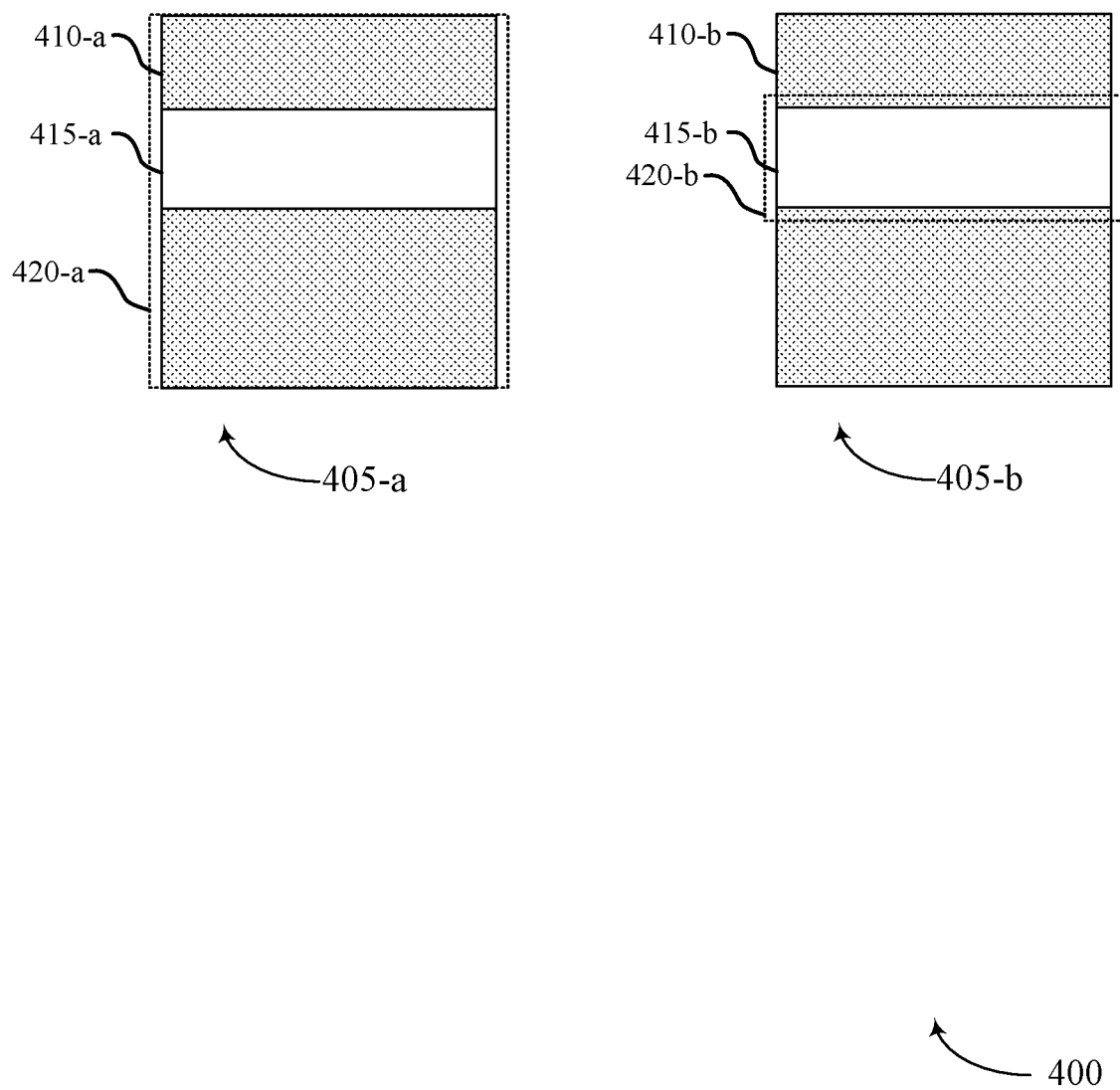
FIG. 4 illustrates one or more examples of a resource diagram that supports management of uplink transmissions and wireless energy transfer signals in accordance with one or more aspects of the present disclosure.

FIG. 4 illustrates one or more examples of a resource diagram 400 that supports management of uplink transmissions and wireless energy transfer signals in accordance with one or more aspects of the present disclosure. In some examples, the resource diagram 300 may implement aspects of wireless communications systems 100 or 200.

As described herein, in some cases, for example as shown in resource diagram 405-a, a network entity 105 may support full duplex of energy transfer signals 415-a and uplink and/or downlink transmissions in a whole carrier or band 410-a. Accordingly, a full duplex region 420-a may correspond to the whole carrier or band 410-a. The network entity 105 may indicate the capability of the network entity 105 to support full duplex of energy transfer signals 415-a and uplink and/or downlink transmissions in a whole carrier or band 410-a to a UE 115, and the UE 115 may communicate with the network entity 105 based on the indication.

In some cases, for example as shown in resource diagram 405-b, a network entity 105 may support full duplex of energy transfer signals 415-b and uplink and/or downlink transmissions in a subband or subset of resources 420-b of a carrier or band 410-b. The network entity 105 may indicate the capability of the network entity 105 to support full duplex of energy transfer signals 415-b and uplink and/or downlink transmissions in the subband or subset of resources 420-b of a carrier or band 410-b to a UE 115, and the UE 115 may communicate with the network entity 105 based on the indication.

Figure 5:
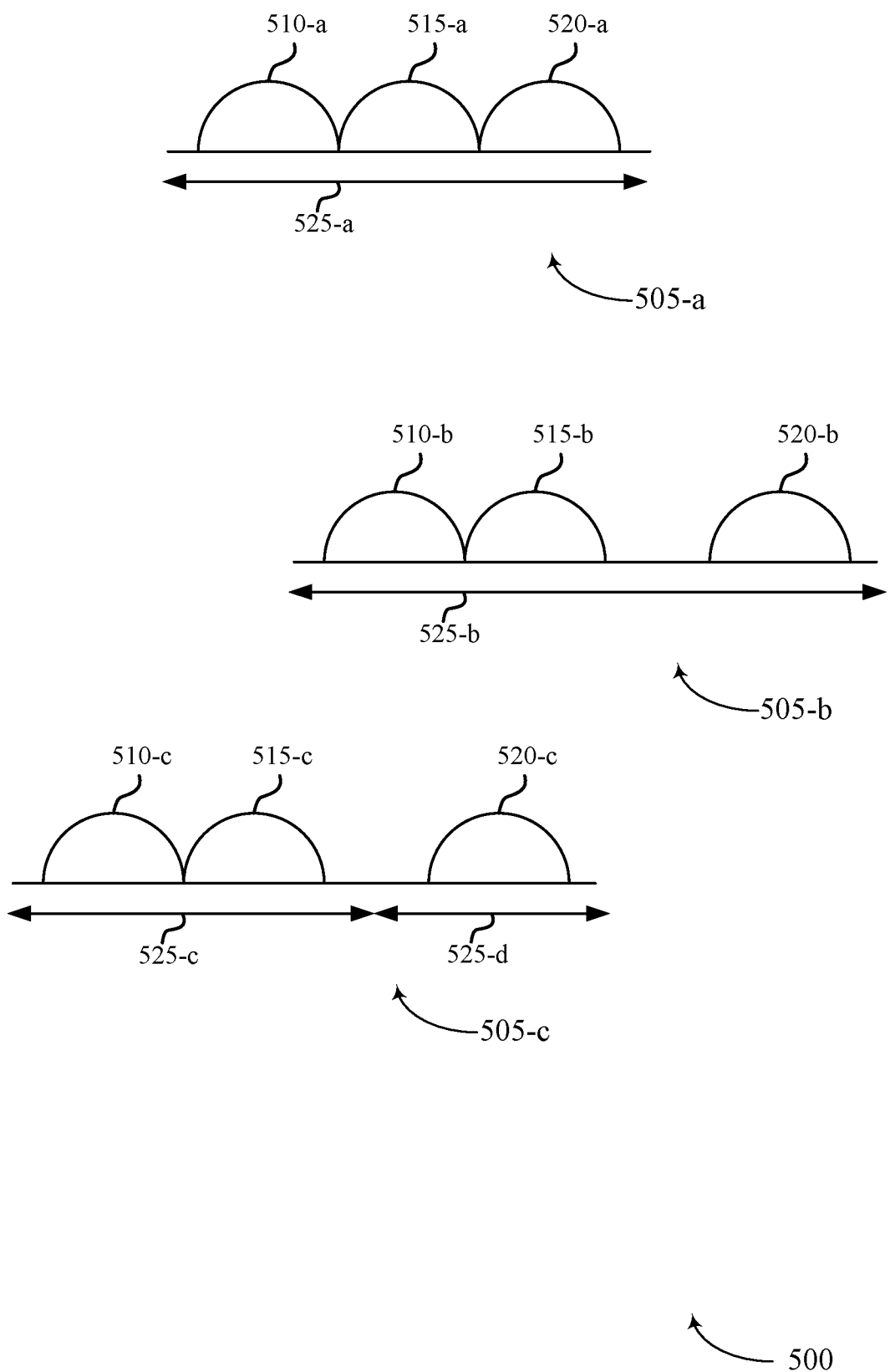
FIG. 5 illustrates one or more examples of a resource diagram that supports management of uplink transmissions and wireless energy transfer signals in accordance with one or more aspects of the present disclosure.

FIG. 5 illustrates one or more examples of a resource diagram 500 that supports management of uplink transmissions and wireless energy transfer signals in accordance with one or more aspects of the present disclosure. In some examples, the resource diagram 300 may implement aspects of wireless communications systems 100 or 200.

As described herein, a network entity 105 may transmit energy transfer signals in uplink resources (e.g., slots or symbols). In some cases, a network entity 105 may support full duplexing of energy transfer signals and uplink transmissions in different band or carrier combinations.

The resource diagram 505-a illustrates an intra band contiguous band 525-a. The intra band contiguous band 525-a may include a first subband 510-a, a second subband 515-a, and a third subband 520-a. The resource diagram 505-b illustrates an intra band non-contiguous band 525-b. The intra band contiguous band 525-a may include a first subband 510-b, a second subband 515-b, and a third subband 520-b, where the third subband 520-b is non-contiguous with the second subband 515-b. The resource diagram 505-c illustrates a first band 525-c and a second band 525-d. The band 525-a may include a first subband 510-c and a second subband 515-c, and the second band 525-d may include a third subband 520-c.

A network entity 105 may support full duplex for an intra band contiguous band 525-a, an intra band non-contiguous band 525-b, or for inter band non-contiguous subbands (e.g., in bands 525-c and 525-d). In some cases, the network entity 105 may support transmission of energy transfer signals in one carrier and simultaneous reception of uplink transmissions in another carrier. In some cases, the network entity 105 may support transmission of energy transfer signals and simultaneous reception of uplink transmissions in the same carrier.

Figure 6:
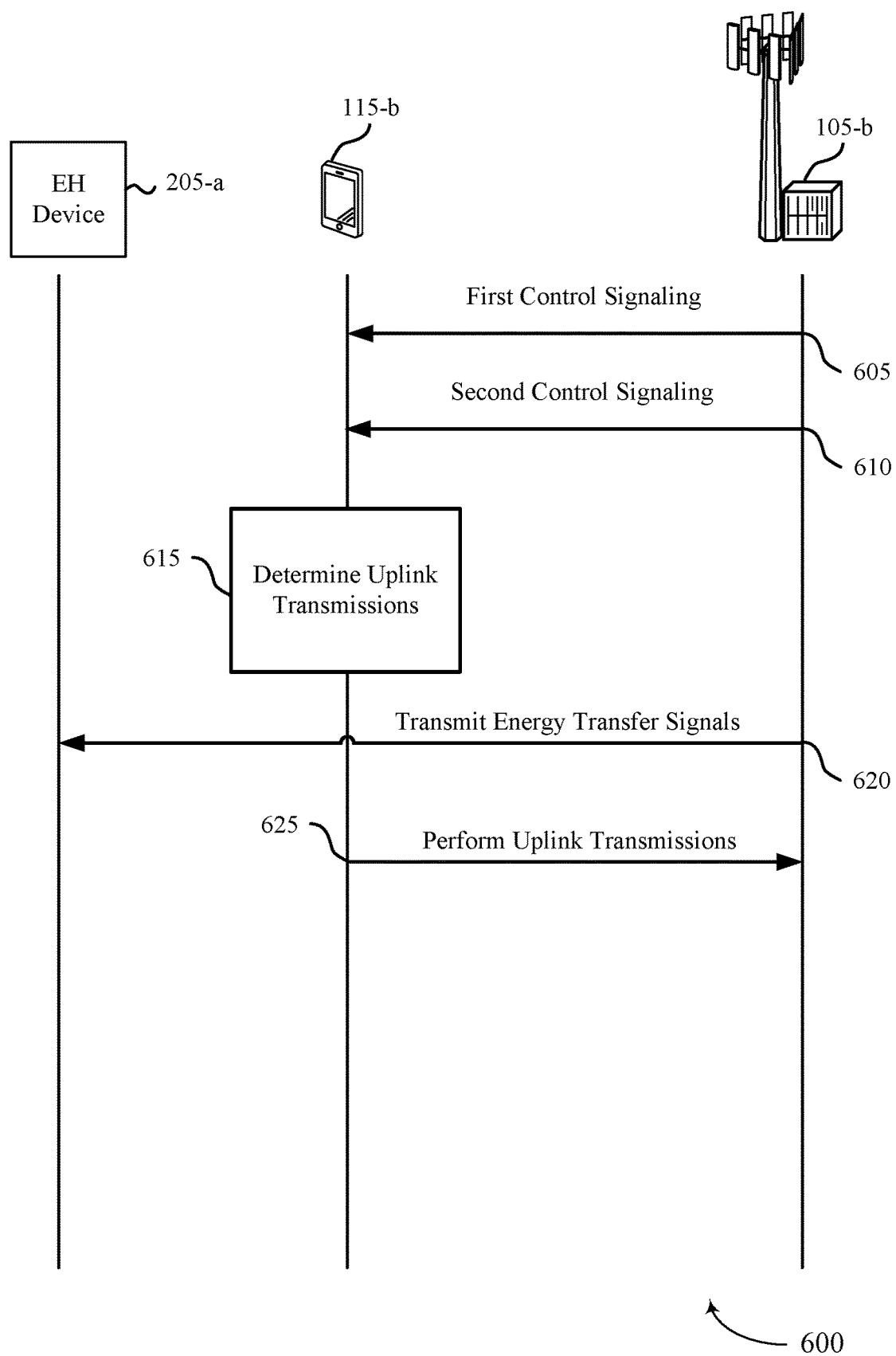
FIG. 6 illustrates an example of a process flow that supports management of uplink transmissions and wireless energy transfer signals in accordance with one or more aspects of the present disclosure.

FIG. 6 illustrates an example of a process flow 600 that supports management of uplink transmissions and wireless energy transfer signals in accordance with one or more aspects of the present disclosure. The process flow 600 may include a UE 115-b, which may be an example of a UE 115 as described herein. The process flow 600 may include a network entity 105-b, which may be an example of a network entity 105 as described herein. The process flow 600 may include an energy harvesting device 205-a, which may be an example of an energy harvesting device 205 as described herein. In the following description of the process flow 600, the operations between the network entity 105-b, the UE 115-b, and the energy harvesting device 205-a may be transmitted in a different order than the example order shown, or the operations performed by the network entity 105-b, the UE 115-b, and the energy harvesting device 205-a may be performed in different orders or at different times. Some operations may also be omitted from the process flow 600, and other operations may be added to the process flow 600.

At 605, the UE 115-b may receive, from the network entity 105-b, first control signaling indicating a capability of the network entity 105-b to support transmission of energy transfer signals in a set of uplink resources configured for the UE 115-b and first scheduling information for a set of energy transfer signals by the network entity 105-b.

At 610, the UE 115-b may receive, from the network entity 105-b, second control signaling indicating second scheduling information for a set of uplink transmissions.

At 615, the UE 115-b may determine which one or more one or more uplink transmissions of the set of uplink transmissions to transmit based on the indicated capability of the network entity 105-b to support transmission of energy transfer signals in the set of uplink resources configured for the UE 115-b, the first scheduling information, and the second scheduling information.

At 620, the network entity 105-b may transmit the set of energy transfer signals to the energy harvesting device 205-a.

At 625, the UE 115-b may perform, and the network entity 105-b may receive, the one or more transmissions of the set of uplink transmissions determined at 615.

In some examples, the UE 115-b may receive, with the first control signaling at 605, an indication that the network entity 105-b supports half duplex transmission of energy transfer signals and reception of uplink transmissions in the set of uplink resources. The UE 115-b may cancel a subset of uplink transmissions of the set of uplink transmissions according to a scheduling overlap between the subset of uplink transmissions and one or more energy transfer signals of the set of energy transfer signals. The one or more uplink transmissions the UE 115-b may transmit at 625 may accordingly include the uplink transmissions of the set of uplink transmissions that are not canceled by the UE 115-b.

In some examples, the UE 115-b may receive, with the first control signaling at 605, an indication that the network entity 105-b supports full duplex transmission of energy transfer signals and reception of uplink transmissions in the set of uplink resources. In such examples, the UE 115-b may transmit the entirety of the set of uplink transmissions at 625. In some examples, the set of uplink resources includes uplink slots within a TDD carrier or an uplink band of a FDD carrier.

In some examples, the UE 115-b may receive, with the first control signaling at 605, an indication that the network entity 105-b supports transmission of an energy transfer signal and reception of an uplink transmission in a subset of uplink resources of the set of uplink resources. In some examples, the UE 115-b may cancel a subset of uplink transmissions of the set of uplink transmissions according to a scheduling overlap between the subset of uplink transmissions and one or more energy transfer signals of the set of energy transfer signals in one or more uplink resources of the set of uplink resources absent from (e.g., outside of) the subset of uplink resources. The one or more uplink transmissions the UE 115-b may transmit at 625 may accordingly include the uplink transmissions of the set of uplink transmissions that are not canceled by the UE 115-b. In some cases, the set of uplink resources may be a carrier band and the subset of uplink resources may be a subband of the carrier band.

In some examples, the UE 115-b may receive, with the first control signaling at 605, an indication that the network entity 105-b supports transmission of energy transfer signals in a first carrier band and reception of uplink transmissions in a second carrier band. In such examples, the UE 115-b may transmit the entirety of the set of uplink transmissions at 625.

In some examples, the UE 115-b may receive, with the first control signaling at 605, an indication that the network entity 105-b does not support transmission of energy transfer signals in the set of uplink resources. In such examples, the UE 115-b may transmit the entirety of the set of uplink transmissions at 625, and the network entity 105-b may not transmit the set of energy transfer signals in the set of uplink resources at 620.

In some examples, the UE 115-b may receive, with the first control signaling at 605, an indication of a second capability of the network entity 105-b to support transmission of energy transfer signals in a set of downlink resources configured for the UE 115-b. The UE 115-b may also receive, from the network entity 105-b, third control signaling indicating third scheduling information for a set of downlink transmissions. The UE 115-b may receive, from the network entity 105-b, one or more downlink transmissions of the set of downlink transmissions based on the second capability, the first scheduling information for the set of energy transfer signals, and the third scheduling information.

Figure 7:
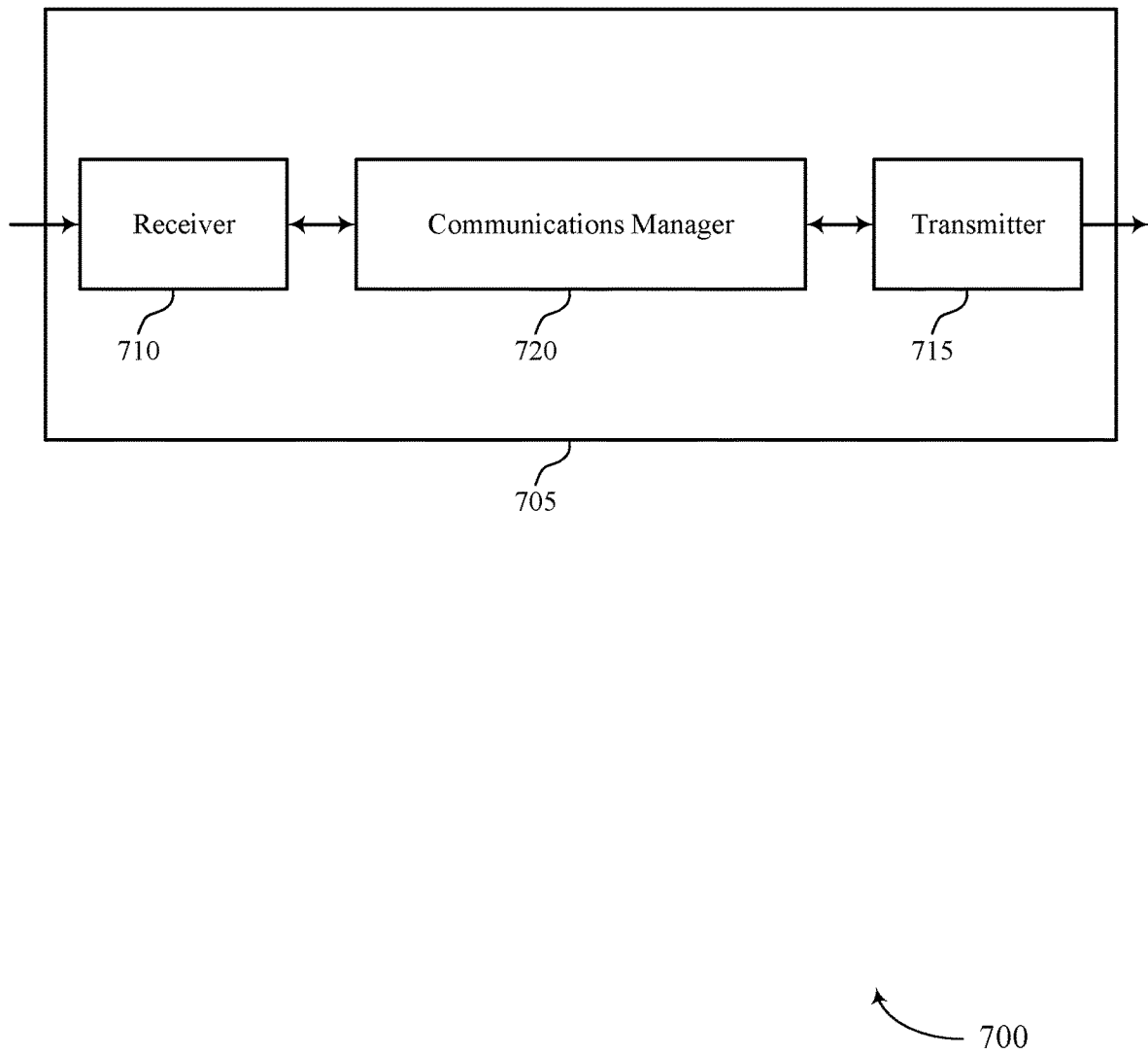
FIGS. 7 and 8 show block diagrams of devices that support management of uplink transmissions and wireless energy transfer signals in accordance with one or more aspects of the present disclosure.

FIG. 7 shows a block diagram 700 of a device 705 that supports management of uplink transmissions and wireless energy transfer signals in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to management of uplink transmissions and wireless energy transfer signals). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to management of uplink transmissions and wireless energy transfer signals). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of management of uplink transmissions and wireless energy transfer signals as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 may be configured as or otherwise support a means for receiving first control signaling indicating a capability of a network entity to support transmission of energy transfer signals in a set of uplink resources configured for a UE and first scheduling information for a set of energy transfer signals by the network entity. The communications manager 720 may be configured as or otherwise support a means for receiving second control signaling indicating second scheduling information for a set of uplink transmissions. The communications manager 720 may be configured as or otherwise support a means for performing one or more uplink transmissions of the set of uplink transmissions based on the capability of the network entity to support transmission of energy transfer signals in the set of uplink resources configured for the UE, the first scheduling information, and the second scheduling information.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources by managing uplink transmissions and energy transfer signals.

Figure 8:
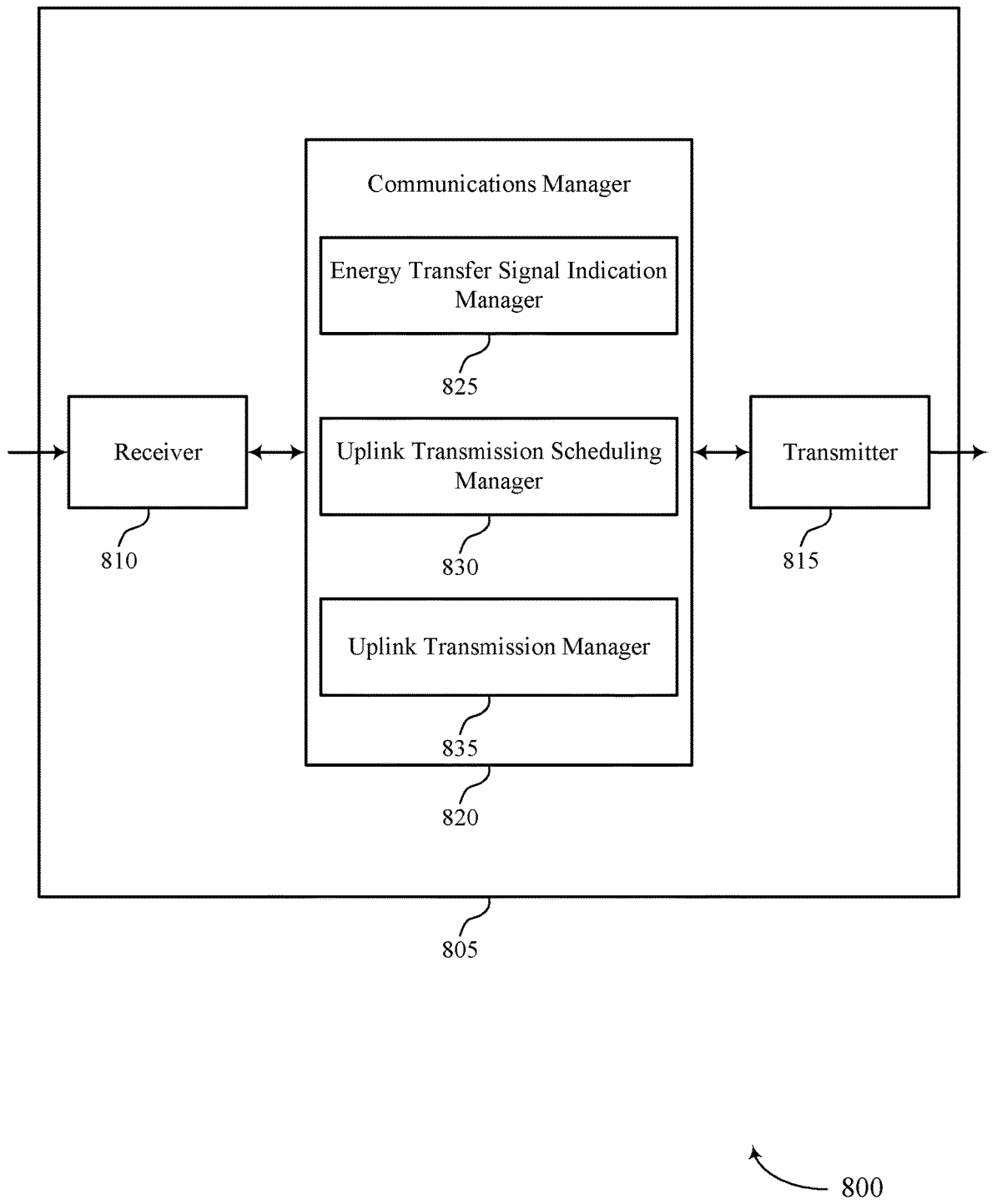

FIG. 8 shows a block diagram 800 of a device 805 that supports management of uplink transmissions and wireless energy transfer signals in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to management of uplink transmissions and wireless energy transfer signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to management of uplink transmissions and wireless energy transfer signals). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of management of uplink transmissions and wireless energy transfer signals as described herein. For example, the communications manager 820 may include an energy transfer signal indication manager 825, an uplink transmission scheduling manager 830, an uplink transmission manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The energy transfer signal indication manager 825 may be configured as or otherwise support a means for receiving first control signaling indicating a capability of a network entity to support transmission of energy transfer signals in a set of uplink resources configured for a UE and first scheduling information for a set of energy transfer signals by the network entity. The uplink transmission scheduling manager 830 may be configured as or otherwise support a means for receiving second control signaling indicating second scheduling information for a set of uplink transmissions. The uplink transmission manager 835 may be configured as or otherwise support a means for performing one or more uplink transmissions of the set of uplink transmissions based on the capability of the network entity to support transmission of energy transfer signals in the set of uplink resources configured for the UE, the first scheduling information, and the second scheduling information.

Figure 9:
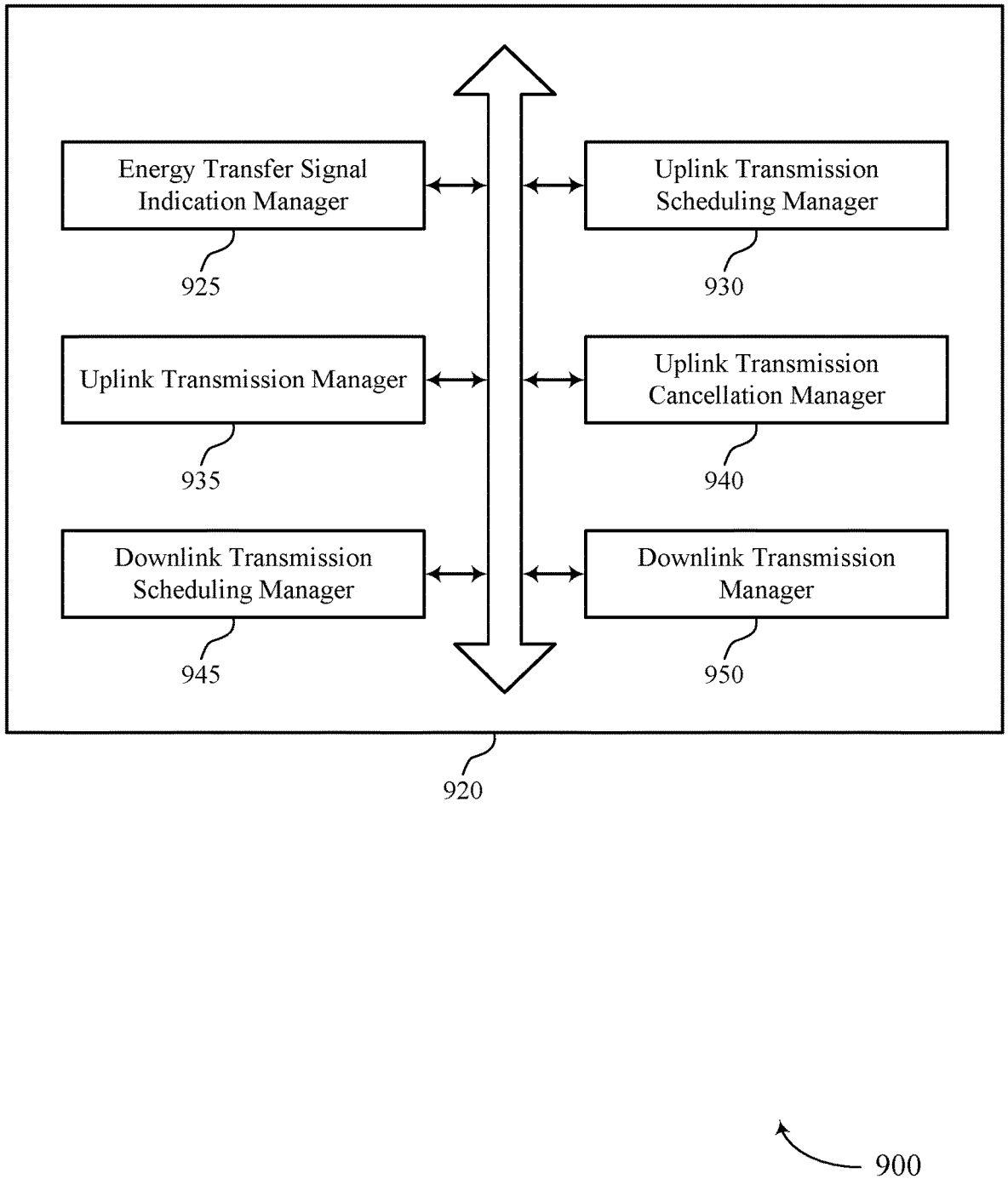
FIG. 9 shows a block diagram of a communications manager that supports management of uplink transmissions and wireless energy transfer signals in accordance with one or more aspects of the present disclosure.

FIG. 9 shows a block diagram 900 of a communications manager 920 that supports management of uplink transmissions and wireless energy transfer signals in accordance with one or more aspects of the present disclosure. The communications manager 920 may be an example of aspects of a communications manager 720, a communications manager 820, or both, as described herein. The communications manager 920, or various components thereof, may be an example of means for performing various aspects of management of uplink transmissions and wireless energy transfer signals as described herein. For example, the communications manager 920 may include an energy transfer signal indication manager 925, an uplink transmission scheduling manager 930, an uplink transmission manager 935, an uplink transmission cancellation manager 940, a downlink transmission scheduling manager 945, a downlink transmission manager 950, or any combination thereof. Each of these components may communicate, directly or indirectly, with one another (e.g., via one or more buses).

The communications manager 920 may support wireless communications in accordance with examples as disclosed herein. The energy transfer signal indication manager 925 may be configured as or otherwise support a means for receiving first control signaling indicating a capability of a network entity to support transmission of energy transfer signals in a set of uplink resources configured for a UE and first scheduling information for a set of energy transfer signals by the network entity. The uplink transmission scheduling manager 930 may be configured as or otherwise support a means for receiving second control signaling indicating second scheduling information for a set of uplink transmissions. The uplink transmission manager 935 may be configured as or otherwise support a means for performing one or more uplink transmissions of the set of uplink transmissions based on the capability of the network entity to support transmission of energy transfer signals in the set of uplink resources configured for the UE, the first scheduling information, and the second scheduling information.

In some examples, the energy transfer signal indication manager 925 may be configured as or otherwise support a means for receiving, with the first control signaling, an indication that the network entity supports half duplex transmission of energy transfer signals and reception of uplink transmissions in the set of uplink resources. In some examples, the uplink transmission cancellation manager 940 may be configured as or otherwise support a means for canceling a subset of uplink transmissions of the set of uplink transmissions according to a scheduling overlap between the subset of uplink transmissions and one or more energy transfer signals of the set of energy transfer signals.

In some examples, the one or more uplink transmissions include a second subset of uplink transmissions of the set of uplink transmissions, the second subset of uplink transmissions including each uplink transmission of the set of uplink transmissions absent from the subset of uplink transmissions of the set of uplink transmissions.

In some examples, to support receiving the first control signaling indicating the capability, the energy transfer signal indication manager 925 may be configured as or otherwise support a means for receiving an indication that the network entity supports full duplex transmission of energy transfer signals and reception of uplink transmissions in the set of uplink resources, and where the one or more uplink transmissions includes an entirety of the set of uplink transmissions.

In some examples, the set of uplink resources includes one of uplink slots within a time division duplexing carrier or an uplink band of a frequency division duplexing carrier.

In some examples, to support receiving the first control signaling indicating the capability, the energy transfer signal indication manager 925 may be configured as or otherwise support a means for receiving an indication that the network entity supports transmission of an energy transfer signal and reception of an uplink transmission in a subset of uplink resources of the set of uplink resources.

In some examples, the uplink transmission cancellation manager 940 may be configured as or otherwise support a means for canceling a subset of uplink transmissions of the set of uplink transmissions according to a scheduling overlap between the subset of uplink transmissions and one or more energy transfer signals of the set of energy transfer signals in one or more uplink resources of the set of uplink resources absent from the subset of uplink resources.

In some examples, the one or more uplink transmissions include a second subset of uplink transmissions of the set of uplink transmissions, the second subset of uplink transmissions including each uplink transmission of the set of uplink transmissions absent from the subset of uplink transmissions of the set of uplink transmissions.

In some examples, the set of uplink resources includes a carrier band. In some examples, the subset of uplink resources includes a subband of the carrier band.

In some examples, to support receiving the first control signaling indicating the capability, the energy transfer signal indication manager 925 may be configured as or otherwise support a means for receiving an indication that the network entity supports transmission of energy transfer signals in a first carrier band and reception of uplink transmissions in a second carrier band, where the one or more uplink transmissions includes an entirety of the set of uplink transmissions within the second carrier band.

In some examples, to support receiving the first control signaling indicating the capability, the energy transfer signal indication manager 925 may be configured as or otherwise support a means for receiving an indication that the network entity does not support transmission of energy transfer signals in the set of uplink resources, and where the one or more uplink transmissions includes an entirety of the set of uplink transmissions.

In some examples, the energy transfer signal indication manager 925 may be configured as or otherwise support a means for receiving, with the first control signaling, an indication of a second capability of the network entity to support transmission of energy transfer signals in a set of downlink resources configured for the UE. In some examples, the downlink transmission scheduling manager 945 may be configured as or otherwise support a means for receiving, from the network entity, third control signaling indicating third scheduling information for a set of downlink transmissions. In some examples, the downlink transmission manager 950 may be configured as or otherwise support a means for receiving, from the network entity, one or more downlink transmissions of the set of downlink transmissions based on the second capability, the first scheduling information, and the third scheduling information.

Figure 10:
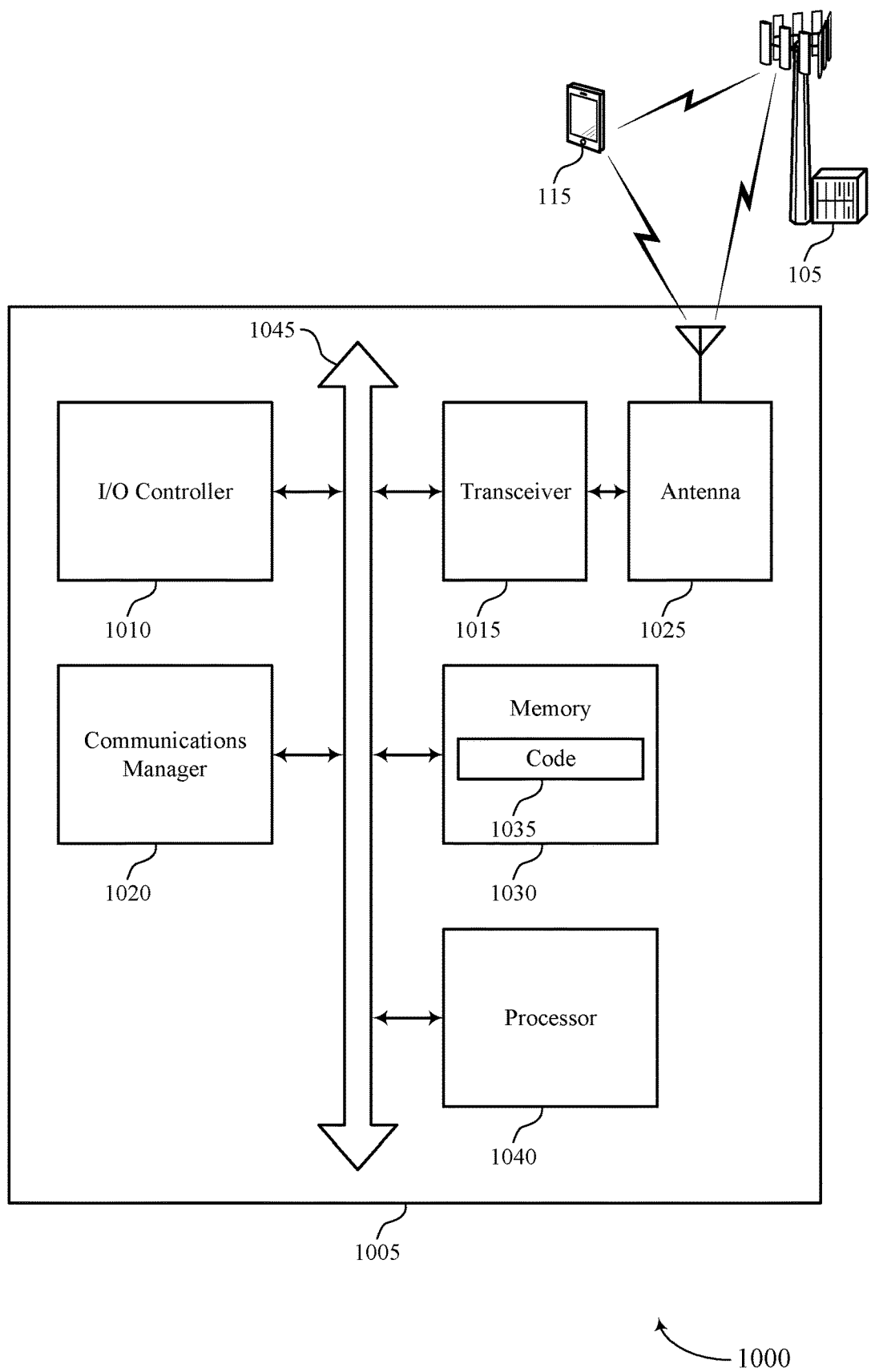
FIG. 10 shows a diagram of a system including a device that supports management of uplink transmissions and wireless energy transfer signals in accordance with one or more aspects of the present disclosure.

FIG. 10 shows a diagram of a system 1000 including a device 1005 that supports management of uplink transmissions and wireless energy transfer signals in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting management of uplink transmissions and wireless energy transfer signals). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications in accordance with examples as disclosed herein. For example, the communications manager 1020 may be configured as or otherwise support a means for receiving first control signaling indicating a capability of a network entity to support transmission of energy transfer signals in a set of uplink resources configured for a UE and first scheduling information for a set of energy transfer signals by the network entity. The communications manager 1020 may be configured as or otherwise support a means for receiving second control signaling indicating second scheduling information for a set of uplink transmissions. The communications manager 1020 may be configured as or otherwise support a means for performing one or more uplink transmissions of the set of uplink transmissions based on the capability of the network entity to support transmission of energy transfer signals in the set of uplink resources configured for the UE, the first scheduling information, and the second scheduling information.

By including or configuring the communications manager 1020 in accordance with examples as described herein, the device 1005 may support techniques for more efficient utilization of communication resources and improved coordination between devices by managing uplink transmissions and energy transfer signals.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of management of uplink transmissions and wireless energy transfer signals as described herein, or the processor 1040 and the memory 1030 may be otherwise configured to perform or support such operations.

Figure 11:
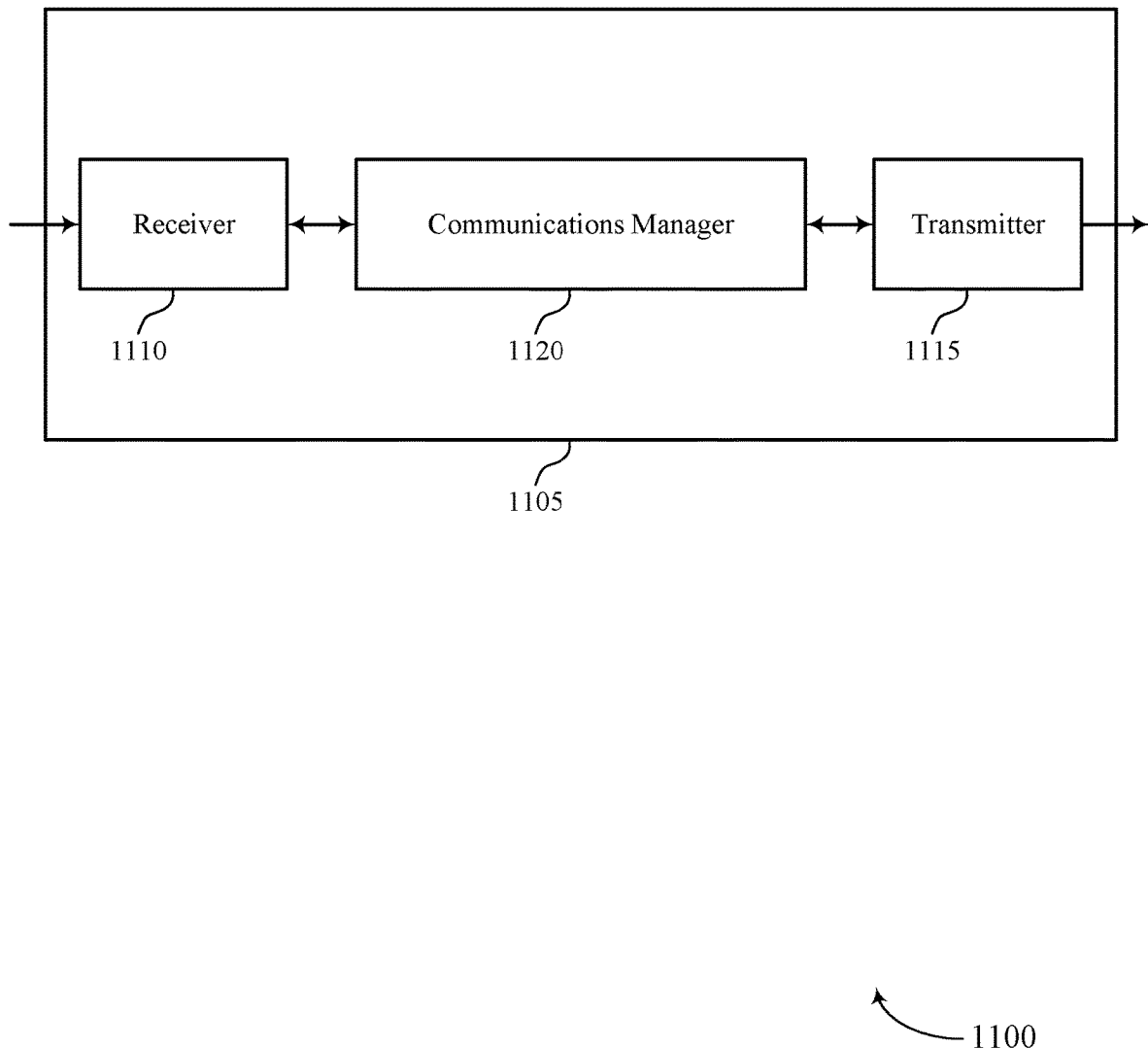
FIGS. 11 and 12 show block diagrams of devices that support management of uplink transmissions and wireless energy transfer signals in accordance with one or more aspects of the present disclosure.

FIG. 11 shows a block diagram 1100 of a device 1105 that supports management of uplink transmissions and wireless energy transfer signals in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of management of uplink transmissions and wireless energy transfer signals as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting first control signaling indicating a capability of the network entity to support transmission energy transfer signals in a set of uplink resources configured for a UE and first scheduling information for a set of energy transfer signals. The communications manager 1120 may be configured as or otherwise support a means for transmitting second control signaling indicating second scheduling information for a set of uplink transmissions by the UE. The communications manager 1120 may be configured as or otherwise support a means for transmitting the set of energy transfer signals. The communications manager 1120 may be configured as or otherwise support a means for receiving one or more uplink transmissions of the set of uplink transmissions based on the capability of the network entity to support transmission of energy transfer signals in the set of uplink resources configured for the UE, the first scheduling information, and the second scheduling information.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources by managing uplink transmissions and energy transfer signals.

Figure 12:
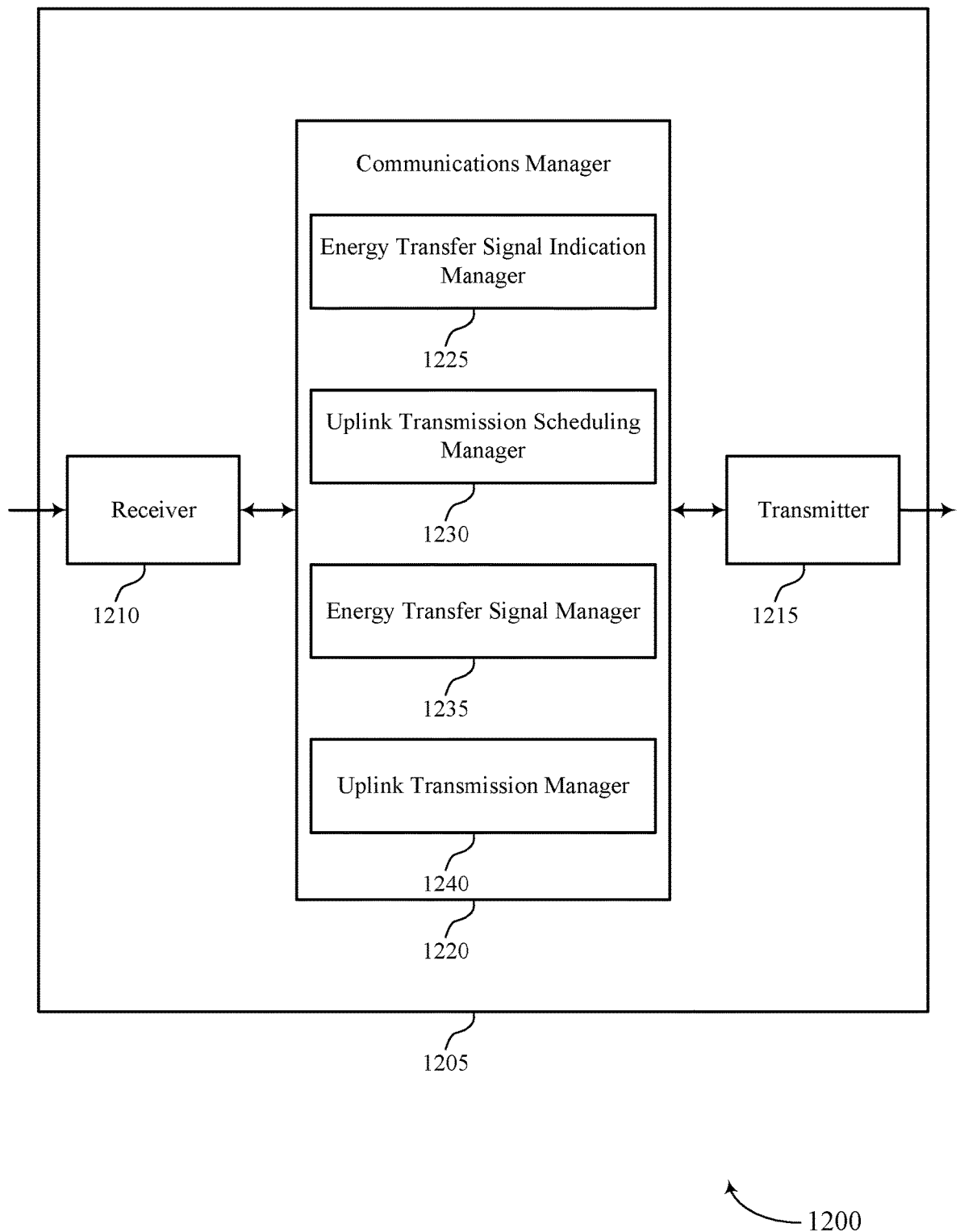

FIG. 12 shows a block diagram 1200 of a device 1205 that supports management of uplink transmissions and wireless energy transfer signals in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of management of uplink transmissions and wireless energy transfer signals as described herein. For example, the communications manager 1220 may include an energy transfer signal indication manager 1225, an uplink transmission scheduling manager 1230, an energy transfer signal manager 1235, an uplink transmission manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The energy transfer signal indication manager 1225 may be configured as or otherwise support a means for transmitting first control signaling indicating a capability of the network entity to support transmission energy transfer signals in a set of uplink resources configured for a UE and first scheduling information for a set of energy transfer signals. The uplink transmission scheduling manager 1230 may be configured as or otherwise support a means for transmitting second control signaling indicating second scheduling information for a set of uplink transmissions by the UE. The energy transfer signal manager 1235 may be configured as or otherwise support a means for transmitting the set of energy transfer signals. The uplink transmission manager 1240 may be configured as or otherwise support a means for receiving one or more uplink transmissions of the set of uplink transmissions based on the capability of the network entity to support transmission of energy transfer signals in the set of uplink resources configured for the UE, the first scheduling information, and the second scheduling information.

Figure 13:
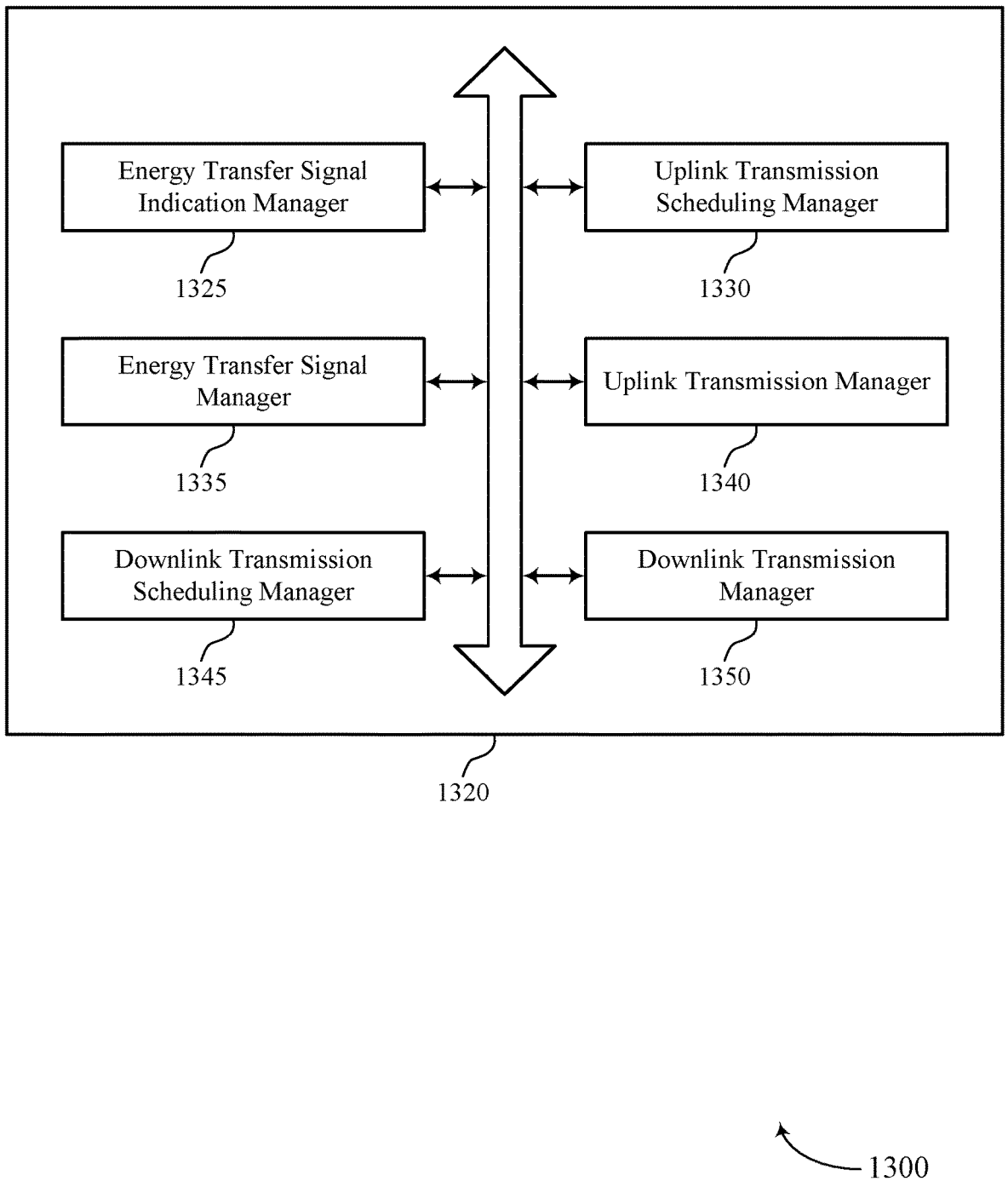
FIG. 13 shows a block diagram of a communications manager that supports management of uplink transmissions and wireless energy transfer signals in accordance with one or more aspects of the present disclosure.

FIG. 13 shows a block diagram 1300 of a communications manager 1320 that supports management of uplink transmissions and wireless energy transfer signals in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of management of uplink transmissions and wireless energy transfer signals as described herein. For example, the communications manager 1320 may include an energy transfer signal indication manager 1325, an uplink transmission scheduling manager 1330, an energy transfer signal manager 1335, an uplink transmission manager 1340, a downlink transmission scheduling manager 1345, a downlink transmission manager 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The energy transfer signal indication manager 1325 may be configured as or otherwise support a means for transmitting first control signaling indicating a capability of the network entity to support transmission energy transfer signals in a set of uplink resources configured for a UE and first scheduling information for a set of energy transfer signals. The uplink transmission scheduling manager 1330 may be configured as or otherwise support a means for transmitting second control signaling indicating second scheduling information for a set of uplink transmissions by the UE. The energy transfer signal manager 1335 may be configured as or otherwise support a means for transmitting the set of energy transfer signals. The uplink transmission manager 1340 may be configured as or otherwise support a means for receiving one or more uplink transmissions of the set of uplink transmissions based on the capability of the network entity to support transmission of energy transfer signals in the set of uplink resources configured for the UE, the first scheduling information, and the second scheduling information.

In some examples, the energy transfer signal indication manager 1325 may be configured as or otherwise support a means for transmitting, with the first control signaling, an indication that the network entity supports half duplex transmission of energy transfer signals and reception of uplink transmissions in the set of uplink resources.

In some examples, a first subset of uplink transmissions of the set of uplink transmissions is subject to a scheduling overlap between the first subset of uplink transmissions and one or more energy transfer signals of the set of energy transfer signals. In some examples, the one or more uplink transmissions include a second subset of uplink transmissions of the set of uplink transmissions, the second subset of uplink transmissions including each uplink transmission of the set of uplink transmissions absent from the first subset of uplink transmissions of the set of uplink transmissions.

In some examples, to support transmitting the first control signaling indicating the capability, the energy transfer signal indication manager 1325 may be configured as or otherwise support a means for transmitting an indication that the network entity supports full duplex transmission of energy transfer signals and reception of uplink transmissions in the set of uplink resources, and where the one or more uplink transmissions includes an entirety of the set of uplink transmissions.

In some examples, the set of uplink resources includes one of uplink slots within a time division duplexing carrier or an uplink band of a frequency division duplexing carrier.

In some examples, to support transmitting the first control signaling indicating the capability, the energy transfer signal indication manager 1325 may be configured as or otherwise support a means for transmitting an indication that the network entity supports transmission of an energy transfer signal and reception of an uplink transmission in a subset of uplink resources of the set of uplink resources.

In some examples, a first subset of uplink transmissions of the set of uplink transmissions is subject to a scheduling overlap between the first subset of uplink transmissions and one or more energy transfer signals of the set of energy transfer signals in one or more uplink resources of the set of uplink resources absent from the subset of uplink resources. In some examples, the one or more uplink transmissions include a second subset of uplink transmissions of the set of uplink transmissions, the second subset of uplink transmissions including each uplink transmission of the set of uplink transmissions absent from the first subset of uplink transmissions of the set of uplink transmissions.

In some examples, the set of uplink resources includes a carrier band. In some examples, the subset of uplink resources includes a subband of the carrier band.

In some examples, to support transmitting the first control signaling indicating the capability, the energy transfer signal indication manager 1325 may be configured as or otherwise support a means for transmitting an indication that the network entity supports transmission of energy transfer signals in a first carrier band and reception of uplink transmissions in a second carrier band, where the one or more uplink transmissions includes an entirety of the set of uplink transmissions within the second carrier band.

In some examples, to support transmitting the first control signaling indicating the capability, the energy transfer signal indication manager 1325 may be configured as or otherwise support a means for transmitting an indication that the network entity does not support transmission of energy transfer signals in the set of uplink resources, and where the one or more uplink transmissions includes an entirety of the set of uplink transmissions.

In some examples, the energy transfer signal indication manager 1325 may be configured as or otherwise support a means for transmitting, with the first control signaling, an indication of a second capability of the network entity to support transmission of energy transfer signals in a set of downlink resources configured for the UE. In some examples, the downlink transmission scheduling manager 1345 may be configured as or otherwise support a means for transmitting third control signaling indicating third scheduling information for a set of downlink transmissions. In some examples, the downlink transmission manager 1350 may be configured as or otherwise support a means for performing one or more downlink transmissions of the set of downlink transmissions based on the second capability, the first scheduling information, and the third scheduling information.

Figure 14:
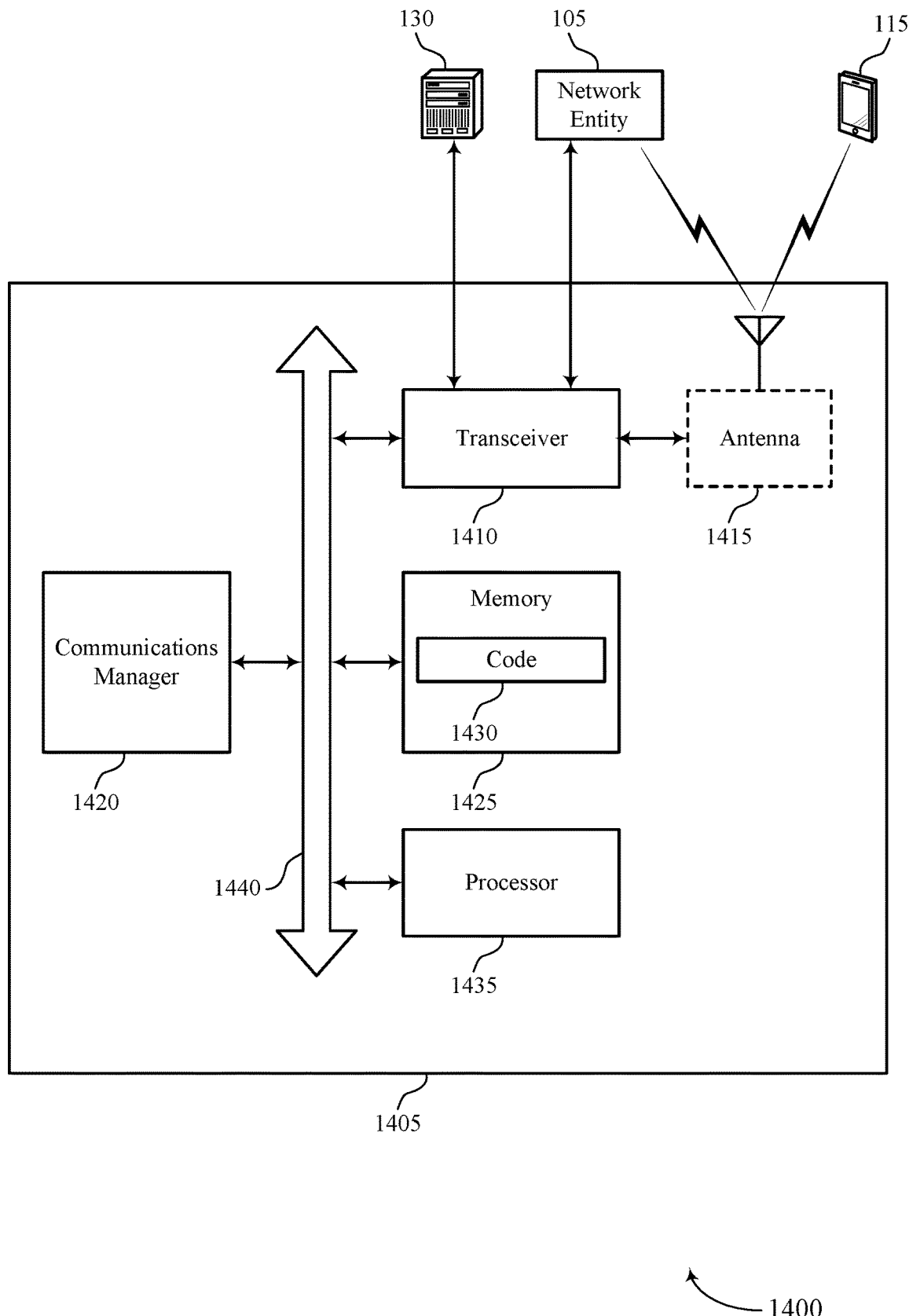
FIG. 14 shows a diagram of a system including a device that supports management of uplink transmissions and wireless energy transfer signals in accordance with one or more aspects of the present disclosure.

FIG. 14 shows a diagram of a system 1400 including a device 1405 that supports management of uplink transmissions and wireless energy transfer signals in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting management of uplink transmissions and wireless energy transfer signals). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting first control signaling indicating a capability of the network entity to support transmission energy transfer signals in a set of uplink resources configured for a UE and first scheduling information for a set of energy transfer signals. The communications manager 1420 may be configured as or otherwise support a means for transmitting second control signaling indicating second scheduling information for a set of uplink transmissions by the UE. The communications manager 1420 may be configured as or otherwise support a means for transmitting the set of energy transfer signals. The communications manager 1420 may be configured as or otherwise support a means for receiving one or more uplink transmissions of the set of uplink transmissions based on the capability of the network entity to support transmission of energy transfer signals in the set of uplink resources configured for the UE, the first scheduling information, and the second scheduling information.

By including or configuring the communications manager 1420 in accordance with examples as described herein, the device 1405 may support techniques for may support techniques for more efficient utilization of communication resources and improved coordination between devices by managing uplink transmissions and energy transfer signals.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of management of uplink transmissions and wireless energy transfer signals as described herein, or the processor 1435 and the memory 1425 may be otherwise configured to perform or support such operations.

Figure 15:
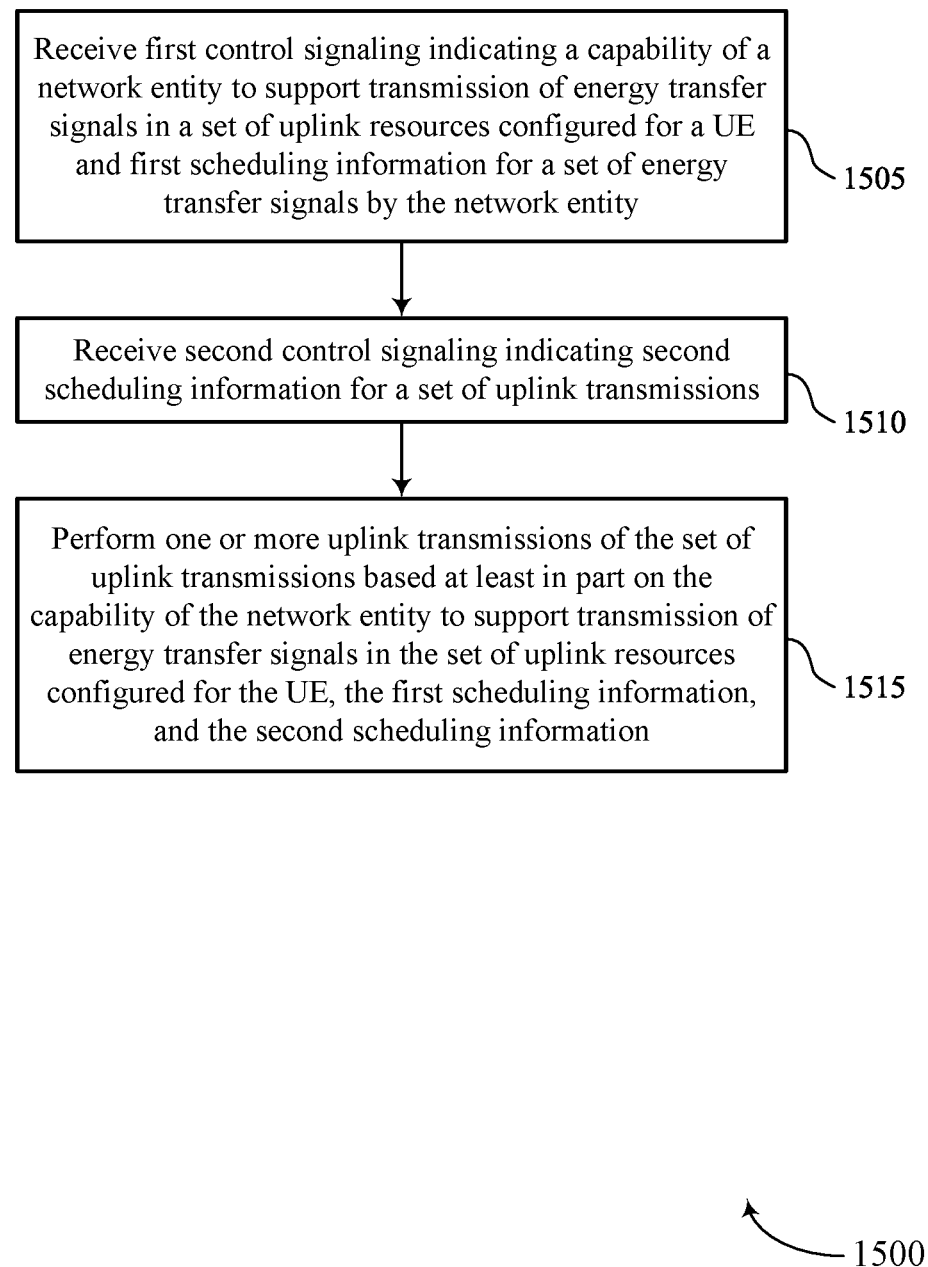
FIGS. 15 through 22 show flowcharts illustrating methods that support management of uplink transmissions and wireless energy transfer signals in accordance with one or more aspects of the present disclosure.

FIG. 15 shows a flowchart illustrating a method 1500 that supports management of uplink transmissions and wireless energy transfer signals in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling indicating a capability of a network entity to support transmission of energy transfer signals in a set of uplink resources configured for a UE and first scheduling information for a set of energy transfer signals by the network entity. The operations of 1505 may be performed in accordance with examples as disclosed herein. In some examples, aspects of the operations of 1505 may be performed by an energy transfer signal indication manager 925 as described with reference to FIG. 9.

At 1510, the method may include receiving second control signaling indicating second scheduling information for a set of uplink transmissions. The operations of 1510 may be performed in accordance with examples as disclosed herein. In some examples, aspects of the operations of 1510 may be performed by an uplink transmission scheduling manager 930 as described with reference to FIG. 9.

At 1515, the method may include performing one or more uplink transmissions of the set of uplink transmissions based at least in part on the capability of the network entity to support transmission of energy transfer signals in the set of uplink resources configured for the UE, the first scheduling information, and the second scheduling information. The operations of 1515 may be performed in accordance with examples as disclosed herein. In some examples, aspects of the operations of 1515 may be performed by an uplink transmission manager 935 as described with reference to FIG. 9.

Figure 16:
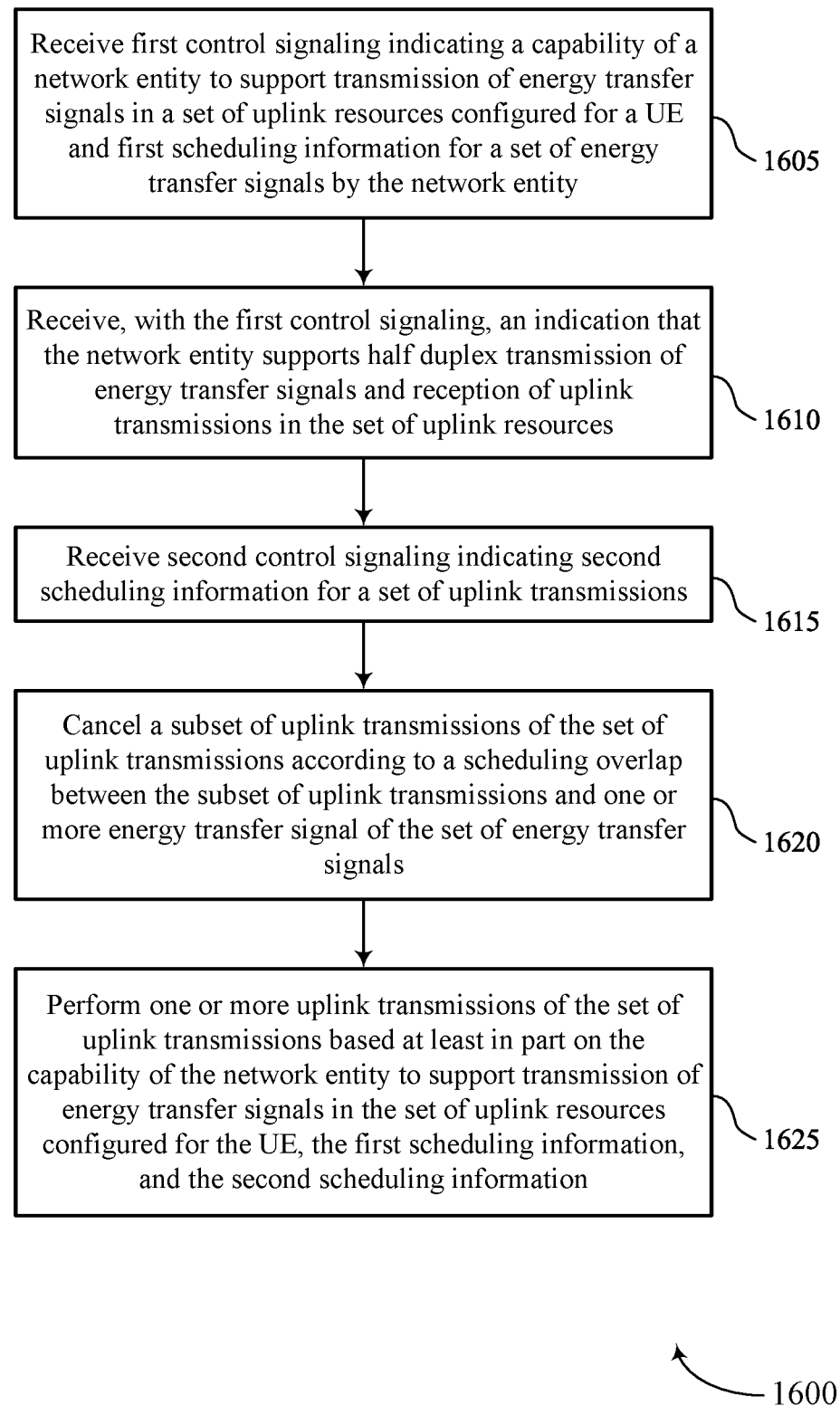

FIG. 16 shows a flowchart illustrating a method 1600 that supports management of uplink transmissions and wireless energy transfer signals in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving first control signaling indicating a capability of a network entity to support transmission of energy transfer signals in a set of uplink resources configured for a UE and first scheduling information for a set of energy transfer signals by the network entity. The operations of 1605 may be performed in accordance with examples as disclosed herein. In some examples, aspects of the operations of 1605 may be performed by an energy transfer signal indication manager 925 as described with reference to FIG. 9.

At 1610, the method may include receiving, with the first control signaling, an indication that the network entity supports half duplex transmission of energy transfer signals and reception of uplink transmissions in the set of uplink resources. The operations of 1610 may be performed in accordance with examples as disclosed herein. In some examples, aspects of the operations of 1610 may be performed by an energy transfer signal indication manager 925 as described with reference to FIG. 9.

At 1615, the method may include receiving second control signaling indicating second scheduling information for a set of uplink transmissions. The operations of 1615 may be performed in accordance with examples as disclosed herein. In some examples, aspects of the operations of 1615 may be performed by an uplink transmission scheduling manager 930 as described with reference to FIG. 9.

At 1620, the method may include canceling a subset of uplink transmissions of the set of uplink transmissions according to a scheduling overlap between the subset of uplink transmissions and one or more energy transfer signals of the set of energy transfer signals. The operations of 1620 may be performed in accordance with examples as disclosed herein. In some examples, aspects of the operations of 1620 may be performed by an uplink transmission cancellation manager 940 as described with reference to FIG. 9.

At 1625, the method may include performing one or more uplink transmissions of the set of uplink transmissions based at least in part on the capability of the network entity to support transmission of energy transfer signals in the set of uplink resources configured for the UE, the first scheduling information, and the second scheduling information. The operations of 1625 may be performed in accordance with examples as disclosed herein. In some examples, aspects of the operations of 1625 may be performed by an uplink transmission manager 935 as described with reference to FIG. 9.

Figure 17:
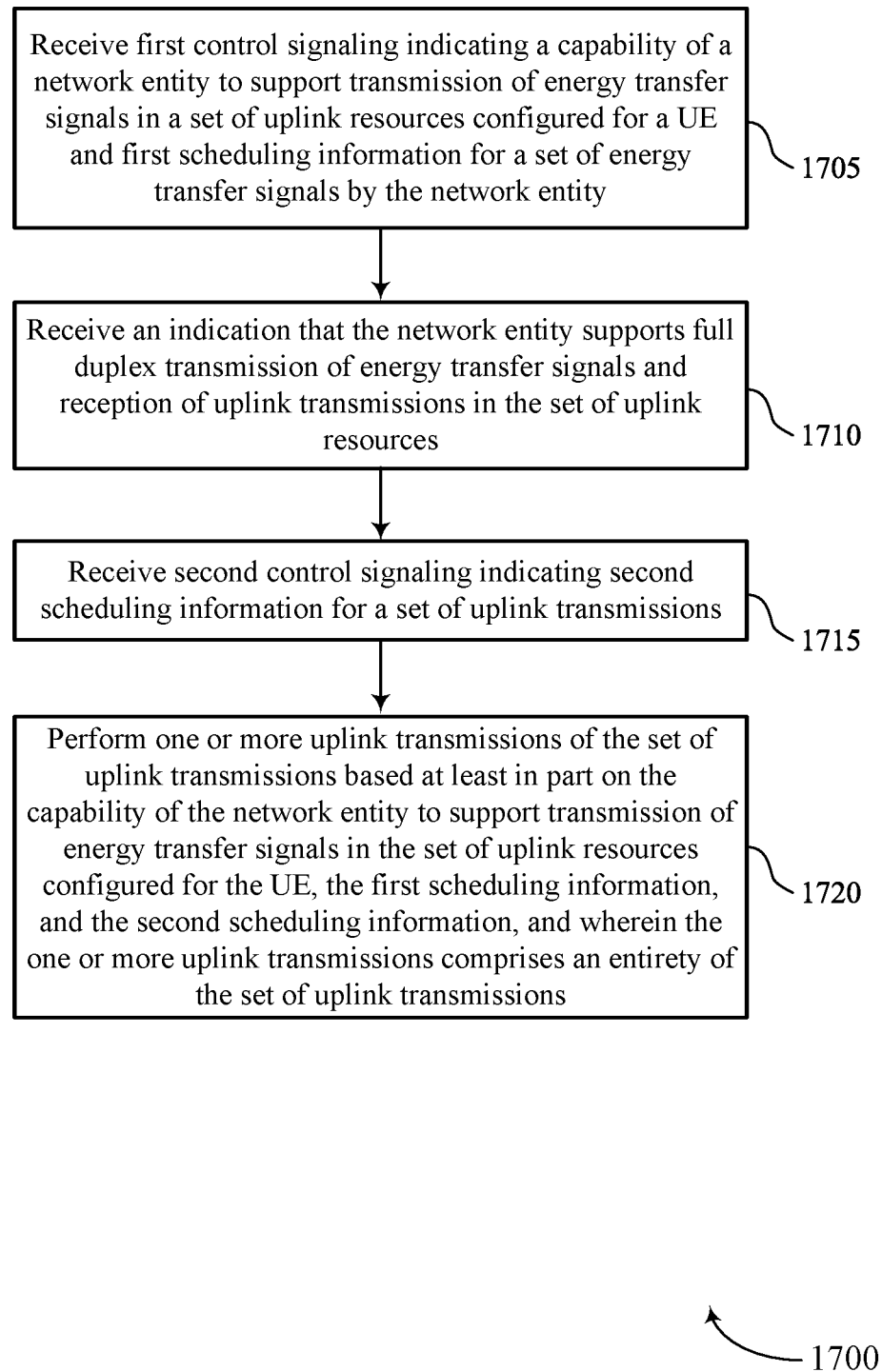

FIG. 17 shows a flowchart illustrating a method 1700 that supports management of uplink transmissions and wireless energy transfer signals in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving first control signaling indicating a capability of a network entity to support transmission of energy transfer signals in a set of uplink resources configured for a UE and first scheduling information for a set of energy transfer signals by the network entity. The operations of 1705 may be performed in accordance with examples as disclosed herein. In some examples, aspects of the operations of 1705 may be performed by an energy transfer signal indication manager 925 as described with reference to FIG. 9.

At 1710, the method may include receiving an indication that the network entity supports full duplex transmission of energy transfer signals and reception of uplink transmissions in the set of uplink resources. The operations of 1710 may be performed in accordance with examples as disclosed herein. In some examples, aspects of the operations of 1710 may be performed by an energy transfer signal indication manager 925 as described with reference to FIG. 9.

At 1715, the method may include receiving second control signaling indicating second scheduling information for a set of uplink transmissions. The operations of 1715 may be performed in accordance with examples as disclosed herein. In some examples, aspects of the operations of 1715 may be performed by an uplink transmission scheduling manager 930 as described with reference to FIG. 9.

At 1720, the method may include performing one or more uplink transmissions of the set of uplink transmissions based at least in part on the capability of the network entity to support transmission of energy transfer signals in the set of uplink resources configured for the UE, the first scheduling information, and the second scheduling information, and where the one or more uplink transmissions includes an entirety of the set of uplink transmissions. The operations of 1720 may be performed in accordance with examples as disclosed herein. In some examples, aspects of the operations of 1720 may be performed by an uplink transmission manager 935 as described with reference to FIG. 9.

Figure 18:
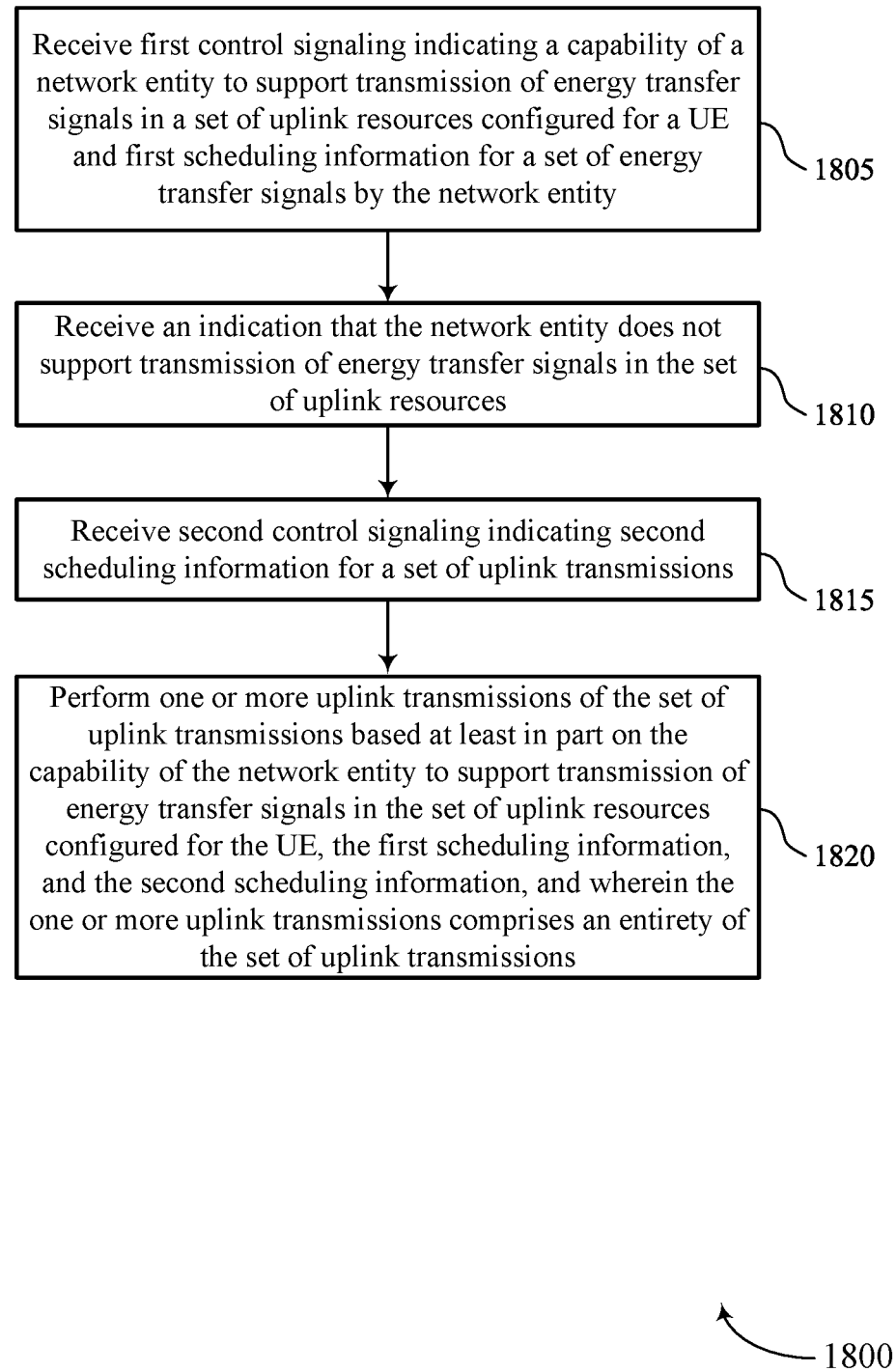

FIG. 18 shows a flowchart illustrating a method 1800 that supports management of uplink transmissions and wireless energy transfer signals in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include receiving first control signaling indicating a capability of a network entity to support transmission of energy transfer signals in a set of uplink resources configured for a UE and first scheduling information for a set of energy transfer signals by the network entity. The operations of 1805 may be performed in accordance with examples as disclosed herein. In some examples, aspects of the operations of 1805 may be performed by an energy transfer signal indication manager 925 as described with reference to FIG. 9.

At 1810, the method may include receiving an indication that the network entity does not support transmission of energy transfer signals in the set of uplink resources. The operations of 1810 may be performed in accordance with examples as disclosed herein. In some examples, aspects of the operations of 1810 may be performed by an energy transfer signal indication manager 925 as described with reference to FIG. 9.

At 1815, the method may include receiving second control signaling indicating second scheduling information for a set of uplink transmissions. The operations of 1815 may be performed in accordance with examples as disclosed herein.

In some examples, aspects of the operations of 1815 may be performed by an uplink transmission scheduling manager 930 as described with reference to FIG. 9.

At 1820, the method may include performing one or more uplink transmissions of the set of uplink transmissions based at least in part on the capability of the network entity to support transmission of energy transfer signals in the set of uplink resources configured for the UE, the first scheduling information, and the second scheduling information, and where the one or more uplink transmissions includes an entirety of the set of uplink transmissions. The operations of 1820 may be performed in accordance with examples as disclosed herein. In some examples, aspects of the operations of 1820 may be performed by an uplink transmission manager 935 as described with reference to FIG. 9.

Figure 19:
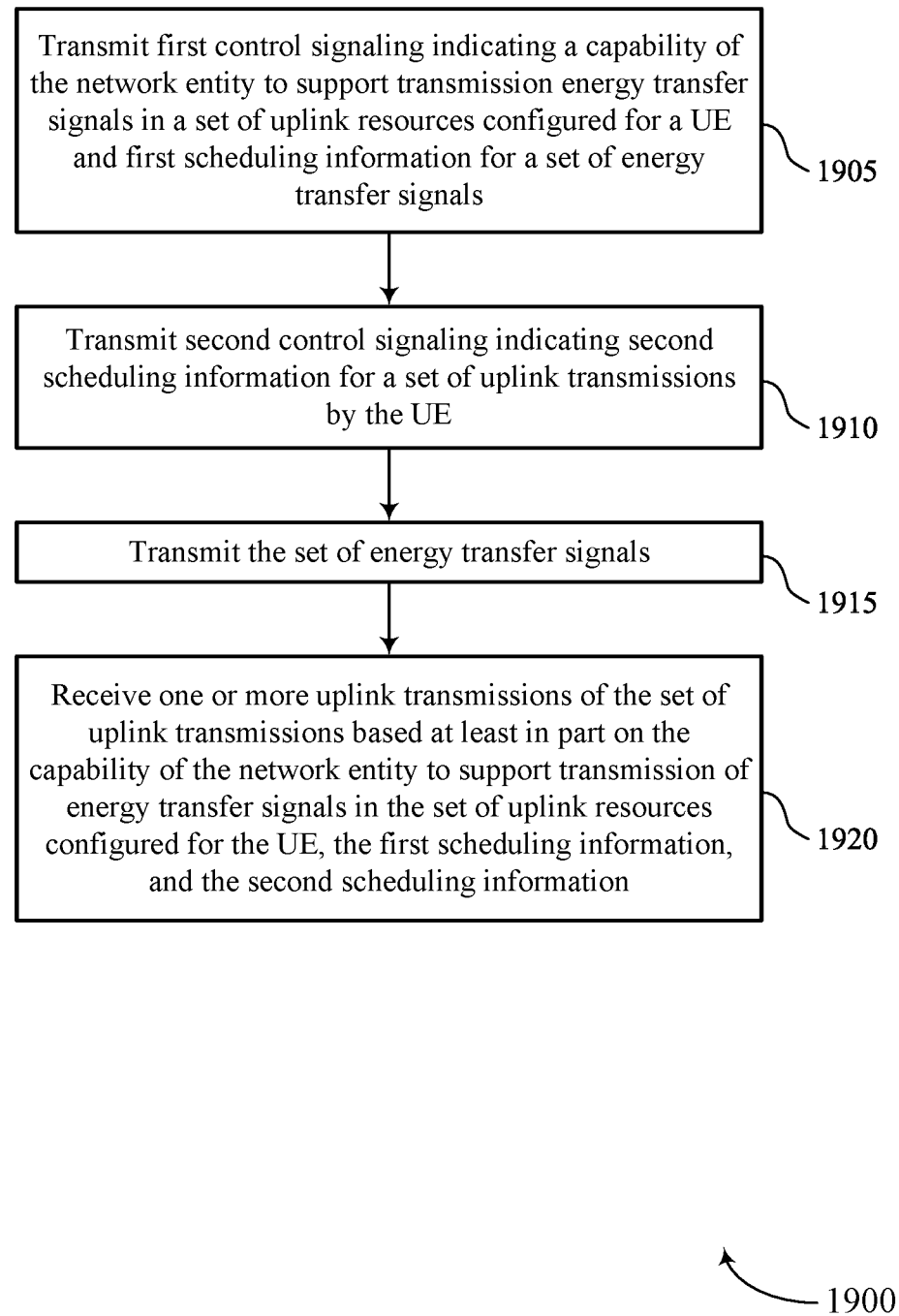

FIG. 19 shows a flowchart illustrating a method 1900 that supports management of uplink transmissions and wireless energy transfer signals in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting first control signaling indicating a capability of the network entity to support transmission energy transfer signals in a set of uplink resources configured for a UE and first scheduling information for a set of energy transfer signals. The operations of 1905 may be performed in accordance with examples as disclosed herein. In some examples, aspects of the operations of 1905 may be performed by an energy transfer signal indication manager 1325 as described with reference to FIG. 13.

At 1910, the method may include transmitting second control signaling indicating second scheduling information for a set of uplink transmissions by the UE. The operations of 1910 may be performed in accordance with examples as disclosed herein. In some examples, aspects of the operations of 1910 may be performed by an uplink transmission scheduling manager 1330 as described with reference to FIG. 13.

At 1915, the method may include transmitting the set of energy transfer signals. The operations of 1915 may be performed in accordance with examples as disclosed herein. In some examples, aspects of the operations of 1915 may be performed by an energy transfer signal manager 1335 as described with reference to FIG. 13.

At 1920, the method may include receiving one or more uplink transmissions of the set of uplink transmissions based at least in part on the capability of the network entity to support transmission of energy transfer signals in the set of uplink resources configured for the UE, the first scheduling information, and the second scheduling information. The operations of 1920 may be performed in accordance with examples as disclosed herein. In some examples, aspects of the operations of 1920 may be performed by an uplink transmission manager 1340 as described with reference to FIG. 13.

Figure 20:
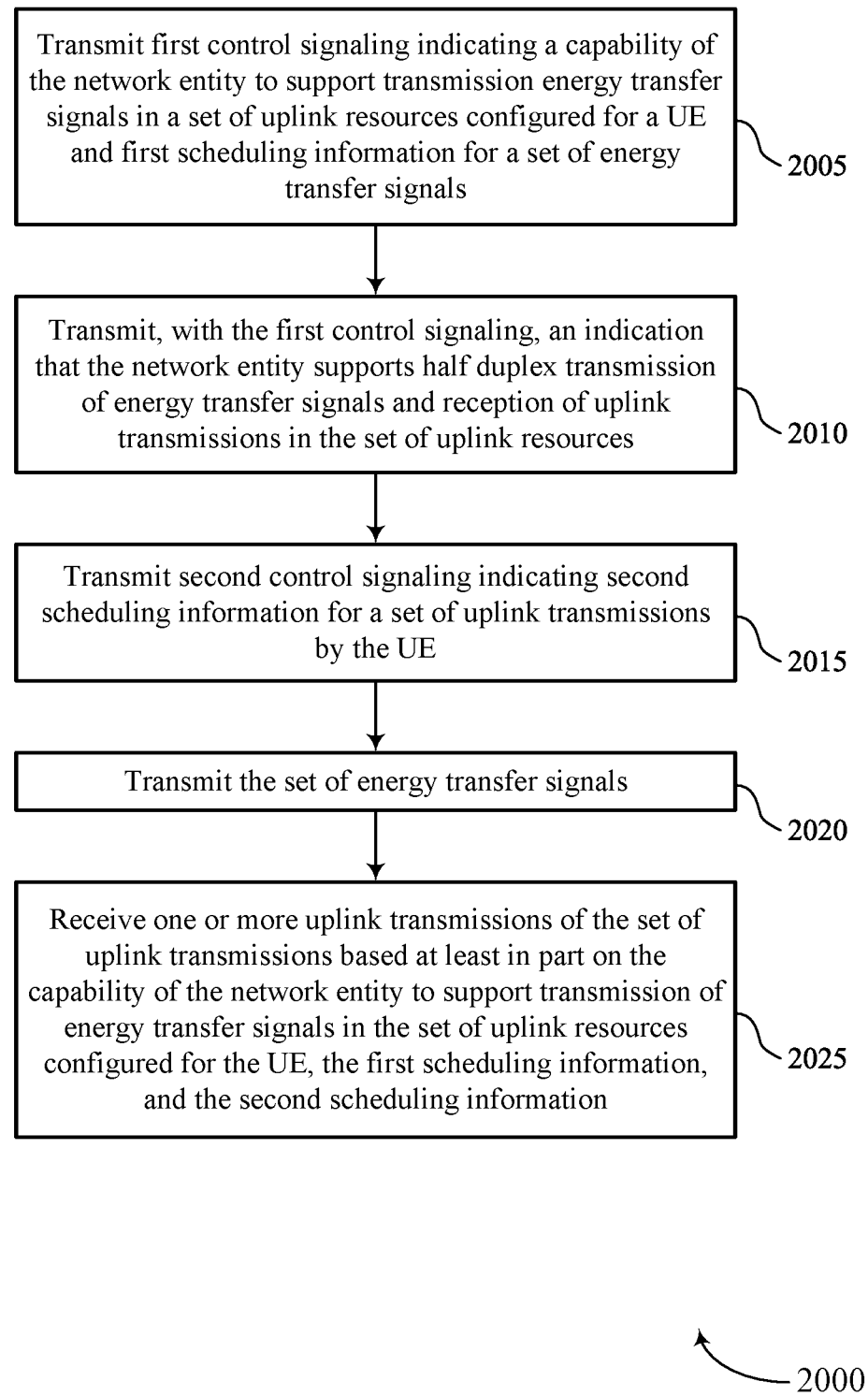

FIG. 20 shows a flowchart illustrating a method 2000 that supports management of uplink transmissions and wireless energy transfer signals in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting first control signaling indicating a capability of the network entity to support transmission energy transfer signals in a set of uplink resources configured for a UE and first scheduling information for a set of energy transfer signals. The operations of 2005 may be performed in accordance with examples as disclosed herein. In some examples, aspects of the operations of 2005 may be performed by an energy transfer signal indication manager 1325 as described with reference to FIG. 13.

At 2010, the method may include transmitting, with the first control signaling, an indication that the network entity supports half duplex transmission of energy transfer signals and reception of uplink transmissions in the set of uplink resources. The operations of 2010 may be performed in accordance with examples as disclosed herein. In some examples, aspects of the operations of 2010 may be performed by an energy transfer signal indication manager 1325 as described with reference to FIG. 13.

At 2015, the method may include transmitting second control signaling indicating second scheduling information for a set of uplink transmissions by the UE. The operations of 2015 may be performed in accordance with examples as disclosed herein. In some examples, aspects of the operations of 2015 may be performed by an uplink transmission scheduling manager 1330 as described with reference to FIG. 13.

At 2020, the method may include transmitting the set of energy transfer signals. The operations of 2020 may be performed in accordance with examples as disclosed herein. In some examples, aspects of the operations of 2020 may be performed by an energy transfer signal manager 1335 as described with reference to FIG. 13.

At 2025, the method may include receiving one or more uplink transmissions of the set of uplink transmissions based at least in part on the capability of the network entity to support transmission of energy transfer signals in the set of uplink resources configured for the UE, the first scheduling information, and the second scheduling information. The operations of 2025 may be performed in accordance with examples as disclosed herein. In some examples, aspects of the operations of 2025 may be performed by an uplink transmission manager 1340 as described with reference to FIG. 13.

Figure 21:
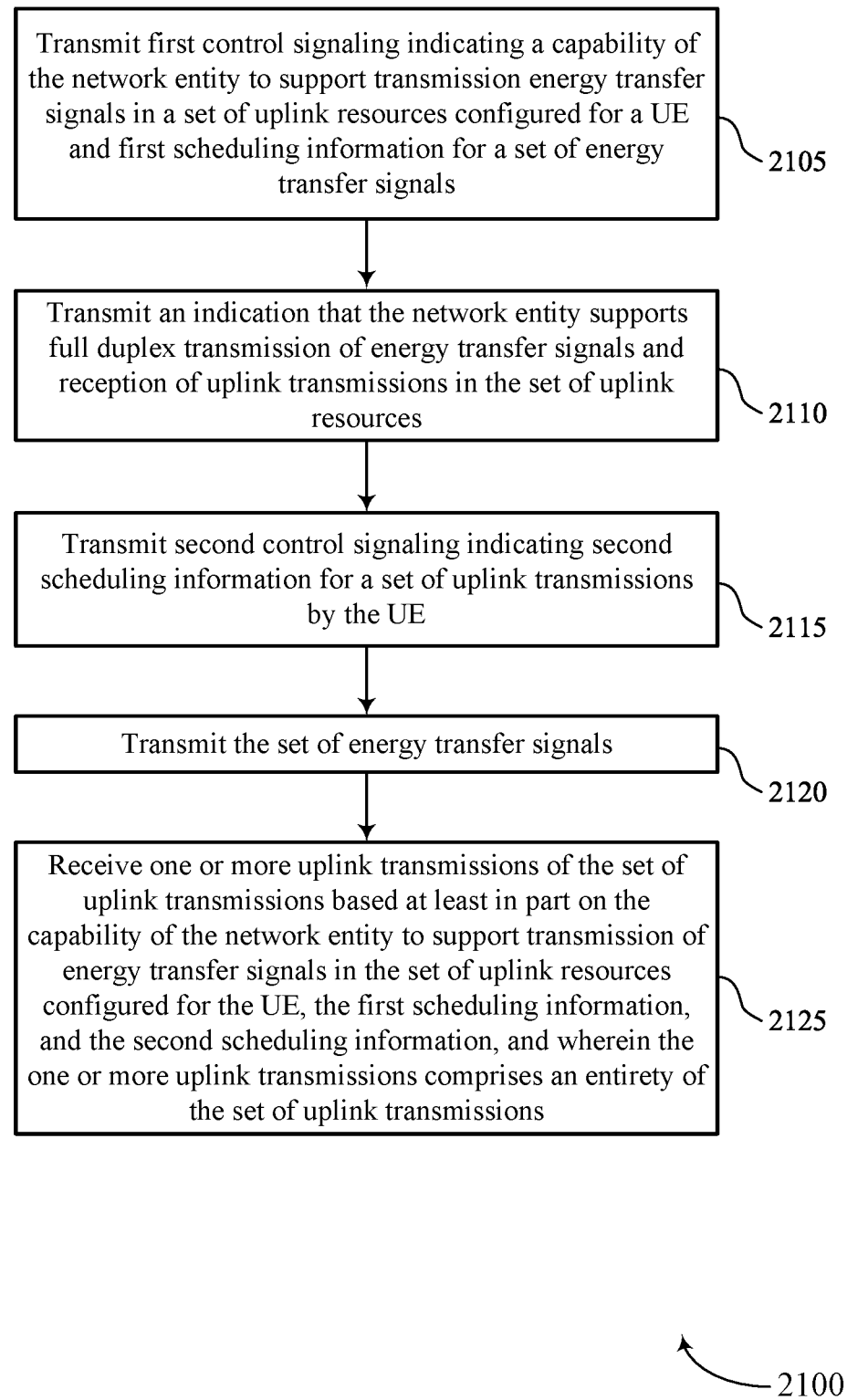

FIG. 21 shows a flowchart illustrating a method 2100 that supports management of uplink transmissions and wireless energy transfer signals in accordance with one or more aspects of the present disclosure. The operations of the method 2100 may be implemented by a network entity or its components as described herein. For example, the operations of the method 2100 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2105, the method may include transmitting first control signaling indicating a capability of the network entity to support transmission energy transfer signals in a set of uplink resources configured for a UE and first scheduling information for a set of energy transfer signals. The operations of 2105 may be performed in accordance with examples as disclosed herein. In some examples, aspects of the operations of 2105 may be performed by an energy transfer signal indication manager 1325 as described with reference to FIG. 13.

At 2110, the method may include transmitting an indication that the network entity supports full duplex transmission of energy transfer signals and reception of uplink transmissions in the set of uplink resources. The operations of 2110 may be performed in accordance with examples as disclosed herein. In some examples, aspects of the operations of 2110 may be performed by an energy transfer signal indication manager 1325 as described with reference to FIG. 13.

At 2115, the method may include transmitting second control signaling indicating second scheduling information for a set of uplink transmissions by the UE. The operations of 2115 may be performed in accordance with examples as disclosed herein. In some examples, aspects of the operations of 2115 may be performed by an uplink transmission scheduling manager 1330 as described with reference to FIG. 13.

At 2120, the method may include transmitting the set of energy transfer signals. The operations of 2120 may be performed in accordance with examples as disclosed herein. In some examples, aspects of the operations of 2120 may be performed by an energy transfer signal manager 1335 as described with reference to FIG. 13.

At 2125, the method may include receiving one or more uplink transmissions of the set of uplink transmissions based at least in part on the capability of the network entity to support transmission of energy transfer signals in the set of uplink resources configured for the UE, the first scheduling information, and the second scheduling information, and where the one or more uplink transmissions includes an entirety of the set of uplink transmissions. The operations of 2125 may be performed in accordance with examples as disclosed herein. In some examples, aspects of the operations of 2125 may be performed by an uplink transmission manager 1340 as described with reference to FIG. 13.

Figure 22:
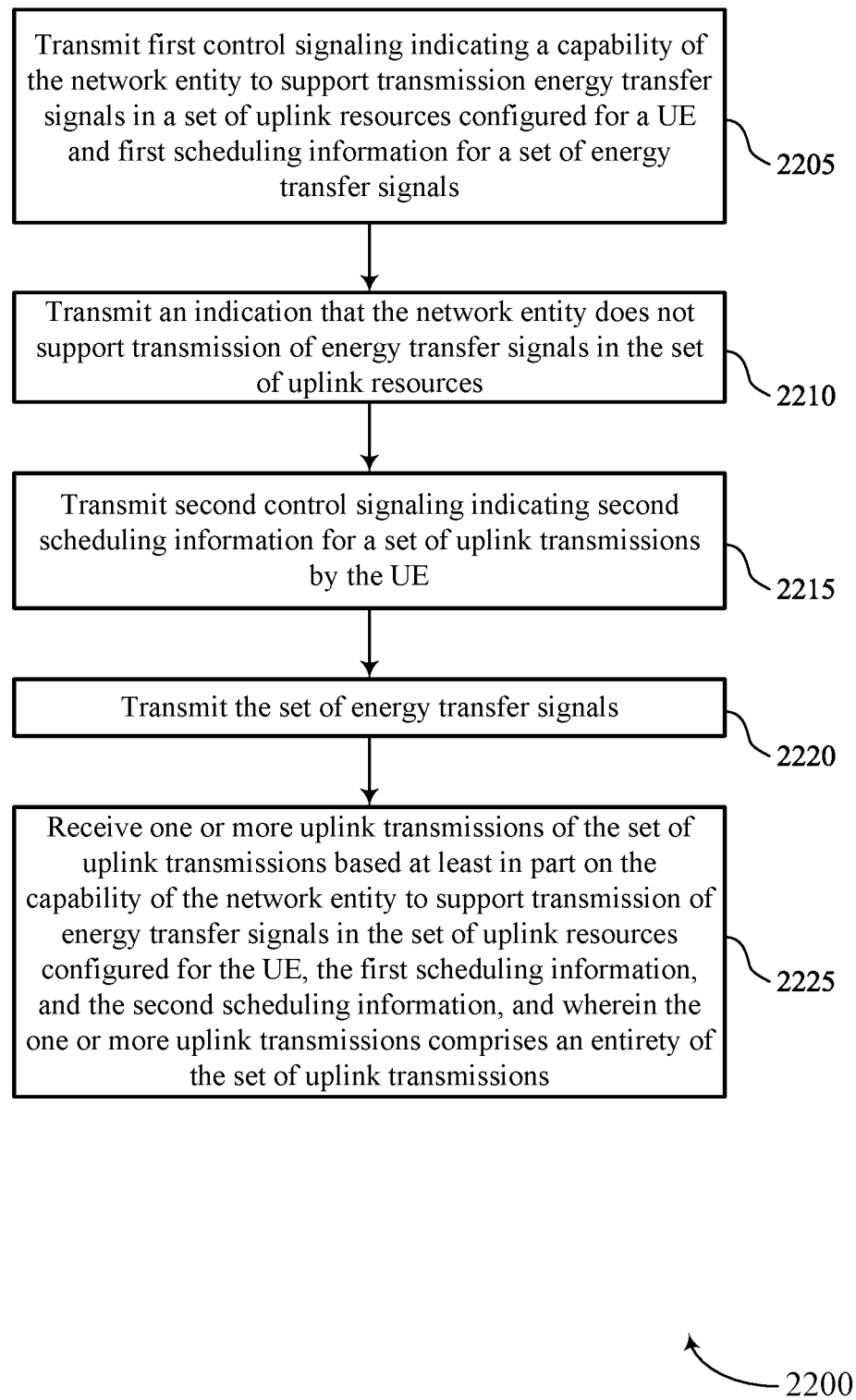

FIG. 22 shows a flowchart illustrating a method 2200 that supports management of uplink transmissions and wireless energy transfer signals in accordance with one or more aspects of the present disclosure. The operations of the method 2200 may be implemented by a network entity or its components as described herein. For example, the operations of the method 2200 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2205, the method may include transmitting first control signaling indicating a capability of the network entity to support transmission energy transfer signals in a set of uplink resources configured for a UE and first scheduling information for a set of energy transfer signals. The operations of 2205 may be performed in accordance with examples as disclosed herein. In some examples, aspects of the operations of 2205 may be performed by an energy transfer signal indication manager 1325 as described with reference to FIG. 13.

At 2210, the method may include transmitting an indication that the network entity does not support transmission of energy transfer signals in the set of uplink resources. The operations of 2210 may be performed in accordance with examples as disclosed herein. In some examples, aspects of the operations of 2210 may be performed by an energy transfer signal indication manager 1325 as described with reference to FIG. 13.

At 2215, the method may include transmitting second control signaling indicating second scheduling information for a set of uplink transmissions by the UE. The operations of 2215 may be performed in accordance with examples as disclosed herein. In some examples, aspects of the operations of 2215 may be performed by an uplink transmission scheduling manager 1330 as described with reference to FIG. 13.

At 2220, the method may include transmitting the set of energy transfer signals. The operations of 2220 may be performed in accordance with examples as disclosed herein. In some examples, aspects of the operations of 2220 may be performed by an energy transfer signal manager 1335 as described with reference to FIG. 13.

At 2225, the method may include receiving one or more uplink transmissions of the set of uplink transmissions based at least in part on the capability of the network entity to support transmission of energy transfer signals in the set of uplink resources configured for the UE, the first scheduling information, and the second scheduling information, and where the one or more uplink transmissions includes an entirety of the set of uplink transmissions. The operations of 2225 may be performed in accordance with examples as disclosed herein. In some examples, aspects of the operations of 2225 may be performed by an uplink transmission manager 1340 as described with reference to FIG. 13.

The following provides an overview of aspects of the present disclosure:

Aspect 1: A method for wireless communications, comprising: receiving first control signaling indicating a capability of a network entity to support transmission of energy transfer signals in a set of uplink resources configured for a UE and first scheduling information for a set of energy transfer signals by the network entity; receiving second control signaling indicating second scheduling information for a set of uplink transmissions; and performing one or more uplink transmissions of the set of uplink transmissions based at least in part on the capability of the network entity to support transmission of energy transfer signals in the set of uplink resources configured for the UE, the first scheduling information, and the second scheduling information.

Aspect 2: The method of aspect 1, further comprising: receiving, with the first control signaling, an indication that the network entity supports half duplex transmission of energy transfer signals and reception of uplink transmissions in the set of uplink resources; and canceling a subset of uplink transmissions of the set of uplink transmissions according to a scheduling overlap between the subset of uplink transmissions and one or more energy transfer signals of the set of energy transfer signals.

Aspect 3: The method of aspect 2, wherein the one or more uplink transmissions comprise a second subset of uplink transmissions of the set of uplink transmissions, the second subset of uplink transmissions comprising each uplink transmission of the set of uplink transmissions absent from the subset of uplink transmissions of the set of uplink transmissions.

Aspect 4: The method of any of aspects 1 through 3, wherein receiving the first control signaling indicating the capability comprises: receiving an indication that the network entity supports full duplex transmission of energy transfer signals and reception of uplink transmissions in the set of uplink resources, and wherein the one or more uplink transmissions comprises an entirety of the set of uplink transmissions.

Aspect 5: The method of aspect 4, wherein the set of uplink resources comprises one of uplink slots within a time division duplexing carrier or an uplink band of a frequency division duplexing carrier.

Aspect 6: The method of any of aspects 1 through 5, wherein receiving the first control signaling indicating the capability comprises: receiving an indication that the network entity supports transmission of an energy transfer signal and reception of an uplink transmission in a subset of uplink resources of the set of uplink resources.

Aspect 7: The method of aspect 6, further comprising: canceling a subset of uplink transmissions of the set of uplink transmissions according to a scheduling overlap between the subset of uplink transmissions and one or more energy transfer signals of the set of energy transfer signals in one or more uplink resources of the set of uplink resources absent from the subset of uplink resources.

Aspect 8: The method of aspect 7, wherein the one or more uplink transmissions comprise a second subset of uplink transmissions of the set of uplink transmissions, the second subset of uplink transmissions comprising each uplink transmission of the set of uplink transmissions absent from the subset of uplink transmissions of the set of uplink transmissions.

Aspect 9: The method of any of aspects 6 through 8, wherein the set of uplink resources comprises a carrier band, and the subset of uplink resources comprises a subband of the carrier band.

Aspect 10: The method of any of aspects 1 through 9, wherein receiving the first control signaling indicating the capability comprises: receiving an indication that the network entity supports transmission of energy transfer signals in a first carrier band and reception of uplink transmissions in a second carrier band, wherein the one or more uplink transmissions comprises an entirety of the set of uplink transmissions within the second carrier band.

Aspect 11: The method of any of aspects 1 through 10, wherein receiving the first control signaling indicating the capability comprises: receiving an indication that the network entity does not support transmission of energy transfer signals in the set of uplink resources, and wherein the one or more uplink transmissions comprises an entirety of the set of uplink transmissions.

Aspect 12: The method of any of aspects 1 through 11, further comprising: receiving, with the first control signaling, an indication of a second capability of the network entity to support transmission of energy transfer signals in a set of downlink resources configured for the UE; receiving, from the network entity, third control signaling indicating third scheduling information for a set of downlink transmissions; and receiving, from the network entity, one or more downlink transmissions of the set of downlink transmissions based at least in part on the second capability, the first scheduling information, and the third scheduling information.

Aspect 13: A method for wireless communications at a network entity, comprising: transmitting first control signaling indicating a capability of the network entity to support transmission energy transfer signals in a set of uplink resources configured for a UE and first scheduling information for a set of energy transfer signals; transmitting second control signaling indicating second scheduling information for a set of uplink transmissions by the UE; transmitting the set of energy transfer signals; and receiving one or more uplink transmissions of the set of uplink transmissions based at least in part on the capability of the network entity to support transmission of energy transfer signals in the set of uplink resources configured for the UE, the first scheduling information, and the second scheduling information.

Aspect 14: The method of aspect 13, further comprising: transmitting, with the first control signaling, an indication that the network entity supports half duplex transmission of energy transfer signals and reception of uplink transmissions in the set of uplink resources.

Aspect 15: The method of aspect 14, wherein a first subset of uplink transmissions of the set of uplink transmissions is subject to a scheduling overlap between the first subset of uplink transmissions and one or more energy transfer signals of the set of energy transfer signals, and the one or more uplink transmissions comprise a second subset of uplink transmissions of the set of uplink transmissions, the second subset of uplink transmissions comprising each uplink transmission of the set of uplink transmissions absent from the first subset of uplink transmissions of the set of uplink transmissions.

Aspect 16: The method of any of aspects 13 through 15, wherein transmitting the first control signaling indicating the capability comprises: transmitting an indication that the network entity supports full duplex transmission of energy transfer signals and reception of uplink transmissions in the set of uplink resources, and wherein the one or more uplink transmissions comprises an entirety of the set of uplink transmissions.

Aspect 17: The method of aspect 16, wherein the set of uplink resources comprises one of uplink slots within a time division duplexing carrier or an uplink band of a frequency division duplexing carrier.

Aspect 18: The method of any of aspects 13 through 17, wherein transmitting the first control signaling indicating the capability comprises: transmitting an indication that the network entity supports transmission of an energy transfer signal and reception of an uplink transmission in a subset of uplink resources of the set of uplink resources.

Aspect 19: The method of aspect 18, wherein a first subset of uplink transmissions of the set of uplink transmissions is subject to a scheduling overlap between the first subset of uplink transmissions and one or more energy transfer signals of the set of energy transfer signals in one or more uplink resources of the set of uplink resources absent from the subset of uplink resources, and the one or more uplink transmissions comprise a second subset of uplink transmissions of the set of uplink transmissions, the second subset of uplink transmissions comprising each uplink transmission of the set of uplink transmissions absent from the first subset of uplink transmissions of the set of uplink transmissions.

Aspect 20: The method of any of aspects 18 through 19, wherein the set of uplink resources comprises a carrier band, and the subset of uplink resources comprises a subband of the carrier band.

Aspect 21: The method of any of aspects 13 through 20, wherein transmitting the first control signaling indicating the capability comprises: transmitting an indication that the network entity supports transmission of energy transfer signals in a first carrier band and reception of uplink transmissions in a second carrier band, wherein the one or more uplink transmissions comprises an entirety of the set of uplink transmissions within the second carrier band.

Aspect 22: The method of any of aspects 13 through 21, wherein transmitting the first control signaling indicating the capability comprises: transmitting an indication that the network entity does not support transmission of energy transfer signals in the set of uplink resources, and wherein the one or more uplink transmissions comprises an entirety of the set of uplink transmissions.

Aspect 23: The method of any of aspects 13 through 22, further comprising: transmitting, with the first control signaling, an indication of a second capability of the network entity to support transmission of energy transfer signals in a set of downlink resources configured for the UE; transmitting third control signaling indicating third scheduling information for a set of downlink transmissions; and performing one or more downlink transmissions of the set of downlink transmissions based at least in part on the second capability, the first scheduling information, and the third scheduling information.

Aspect 24: An apparatus for wireless communications at a UE, comprising at least one processor; memory coupled with the at least one processor; and instructions stored in the memory and executable by the at least one processor to cause the UE to perform a method of any of aspects 1 through 12.

Aspect 25: An apparatus for wireless communications at a UE, comprising at least one means for performing a method of any of aspects 1 through 12.

Aspect 26: A non-transitory computer-readable medium storing code for wireless communications at a UE, the code comprising instructions executable by a processor to perform a method of any of aspects 1 through 12.

Aspect 27: An apparatus for wireless communications at a network entity, comprising at least one processor; memory coupled with the at least one processor; and instructions stored in the memory and executable by the at least one processor to cause the network entity to perform a method of any of aspects 13 through 23.

Aspect 28: An apparatus for wireless communications at a network entity, comprising at least one means for performing a method of any of aspects 13 through 23.

Aspect 29: A non-transitory computer-readable medium storing code for wireless communications at a network entity, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   memory coupled to the at least one processor, the memory storing instructions executable by the at least one processor, directly or after compilation, to cause the UE to:
   receive first control signaling indicating a capability of a network entity to support transmission of energy transfer signals in a set of uplink resources configured for the UE and first scheduling information for a set of energy transfer signals by the network entity in at least a subset of the set of uplink resources;
   receive second control signaling indicating second scheduling information for a set of uplink transmissions for the UE to perform in the set of uplink resources; and
   perform one or more uplink transmissions of the set of uplink transmissions based at least in part on the capability of the network entity to support transmission of energy transfer signals in the set of uplink resources configured for the UE, the first scheduling information, and the second scheduling information.

2. The apparatus of claim 1, wherein the instructions are further executable by the at least one processor to cause the UE to:
   receive, with the first control signaling, an indication that the network entity supports half duplex transmission of energy transfer signals and reception of uplink transmissions in the set of uplink resources; and
   cancel a subset of uplink transmissions of the set of uplink transmissions according to a scheduling overlap between the subset of uplink transmissions and one or more energy transfer signals of the set of energy transfer signals.

3. The apparatus of claim 2, wherein the one or more uplink transmissions comprise a second subset of uplink transmissions of the set of uplink transmissions, the second subset of uplink transmissions comprising each uplink transmission of the set of uplink transmissions absent from the subset of uplink transmissions of the set of uplink transmissions.

4. The apparatus of claim 1, wherein the instructions to receive the first control signaling indicating the capability are executable by the at least one processor to cause the UE to:
   receive an indication that the network entity supports full duplex transmission of energy transfer signals and reception of uplink transmissions in the set of uplink resources, and wherein the one or more uplink transmissions comprises an entirety of the set of uplink transmissions.

5. The apparatus of claim 4, wherein the set of uplink resources comprises one of uplink slots within a time division duplexing carrier or an uplink band of a frequency division duplexing carrier.

6. The apparatus of claim 1, wherein the instructions to receive the first control signaling indicating the capability are executable by the at least one processor to cause the UE to:

receive an indication that the network entity supports transmission of an energy transfer signal and reception of an uplink transmission in a subset of uplink resources of the set of uplink resources.

7. The apparatus of claim 6, wherein the instructions are further executable by the at least one processor to cause the UE to:
cancel a subset of uplink transmissions of the set of uplink transmissions according to a scheduling overlap between the subset of uplink transmissions and one or more energy transfer signals of the set of energy transfer signals in one or more uplink resources of the set of uplink resources absent from the subset of uplink resources.

8. The apparatus of claim 7, wherein the one or more uplink transmissions comprise a second subset of uplink transmissions of the set of uplink transmissions, the second subset of uplink transmissions comprising each uplink transmission of the set of uplink transmissions absent from the subset of uplink transmissions of the set of uplink transmissions.

9. The apparatus of claim 6, wherein:
the set of uplink resources comprises a carrier band, and
the subset of uplink resources comprises a subband of the carrier band.

10. The apparatus of claim 1, wherein the instructions to receive the first control signaling indicating the capability are executable by the at least one processor to cause the UE to:
receive an indication that the network entity supports transmission of energy transfer signals in a first carrier band and reception of uplink transmissions in a second carrier band, wherein the one or more uplink transmissions comprises an entirety of the set of uplink transmissions within the second carrier band.

11. The apparatus of claim 1, wherein the instructions to receive the first control signaling indicating the capability are executable by the at least one processor to cause the UE to:
receive an indication that the network entity does not support transmission of energy transfer signals in the set of uplink resources, and wherein the one or more uplink transmissions comprises an entirety of the set of uplink transmissions.

12. The apparatus of claim 1, wherein the instructions are further executable by the at least one processor to cause the UE to:
receive, with the first control signaling, an indication of a second capability of the network entity to support transmission of energy transfer signals in a set of downlink resources configured for the UE;
receive, from the network entity, third control signaling indicating third scheduling information for a set of downlink transmissions; and
receive, from the network entity, one or more downlink transmissions of the set of downlink transmissions based at least in part on the second capability, the first scheduling information, and the third scheduling information.

13. An apparatus for wireless communications at a network entity, comprising:
at least one processor; and
memory coupled to the at least one processor, the memory storing instructions executable by the at least one processor, directly or after compilation, to cause the network entity to:
transmit first control signaling indicating a capability of the network entity to support transmission of energy transfer signals in a set of uplink resources configured for a user equipment (UE) and first scheduling information for a set of energy transfer signals in at least a subset of the set of uplink resources;
transmit second control signaling indicating second scheduling information for a set of uplink transmissions by the UE for the UE to perform in the set of uplink resources;
transmit the set of energy transfer signals; and
receive one or more uplink transmissions of the set of uplink transmissions based at least in part on the capability of the network entity to support transmission of energy transfer signals in the set of uplink resources configured for the UE, the first scheduling information, and the second scheduling information.

14. The apparatus of claim 13, wherein the instructions are further executable by the at least one processor to cause the network entity to:
transmit, with the first control signaling, an indication that the network entity supports half duplex transmission of energy transfer signals and reception of uplink transmissions in the set of uplink resources.

15. The apparatus of claim 14, wherein:
a first subset of uplink transmissions of the set of uplink transmissions is subject to a scheduling overlap between the first subset of uplink transmissions and one or more energy transfer signals of the set of energy transfer signals, and
the one or more uplink transmissions comprise a second subset of uplink transmissions of the set of uplink transmissions, the second subset of uplink transmissions comprising each uplink transmission of the set of uplink transmissions absent from the first subset of uplink transmissions of the set of uplink transmissions.

16. The apparatus of claim 13, wherein the instructions to transmit the first control signaling indicating the capability are executable by the at least one processor to cause the network entity to:
transmit an indication that the network entity supports full duplex transmission of energy transfer signals and reception of uplink transmissions in the set of uplink resources, and wherein the one or more uplink transmissions comprises an entirety of the set of uplink transmissions.

17. The apparatus of claim 16, wherein the set of uplink resources comprises one of uplink slots within a time division duplexing carrier or an uplink band of a frequency division duplexing carrier.

18. The apparatus of claim 13, wherein the instructions to transmit the first control signaling indicating the capability are executable by the at least one processor to cause the network entity to:
transmit an indication that the network entity supports transmission of an energy transfer signal and reception of an uplink transmission in a subset of uplink resources of the set of uplink resources.

19. The apparatus of claim 18, wherein:
a first subset of uplink transmissions of the set of uplink transmissions is subject to a scheduling overlap between the first subset of uplink transmissions and one or more energy transfer signals of the set of energy transfer signals in one or more uplink resources of the set of uplink resources absent from the subset of uplink resources, and the one or more uplink transmissions comprise a second subset of uplink transmissions of the set of uplink transmissions, the second subset of uplink transmissions comprising each uplink transmission of the set of uplink transmissions absent from the first subset of uplink transmissions of the set of uplink transmissions.

20. The apparatus of claim 18, wherein:
the set of uplink resources comprises a carrier band, and the subset of uplink resources comprises a subband of the carrier band.

21. The apparatus of claim 13, wherein the instructions to transmit the first control signaling indicating the capability are executable by the at least one processor to cause the network entity to:
transmit an indication that the network entity supports transmission of energy transfer signals in a first carrier band and reception of uplink transmissions in a second carrier band, wherein the one or more uplink transmissions comprises an entirety of the set of uplink transmissions within the second carrier band.

22. The apparatus of claim 13, wherein the instructions to transmit the first control signaling indicating the capability are executable by the at least one processor to cause the network entity to:
transmit an indication that the network entity does not support transmission of energy transfer signals in the set of uplink resources, and wherein the one or more uplink transmissions comprises an entirety of the set of uplink transmissions.

23. The apparatus of claim 13, wherein the instructions are further executable by the at least one processor to cause the network entity to:
transmit, with the first control signaling, an indication of a second capability of the network entity to support transmission of energy transfer signals in a set of downlink resources configured for the UE;
transmit third control signaling indicating third scheduling information for a set of downlink transmissions; and
perform one or more downlink transmissions of the set of downlink transmissions based at least in part on the second capability, the first scheduling information, and the third scheduling information.

24. A method for wireless communications, comprising:
receiving first control signaling indicating a capability of a network entity to support transmission of energy transfer signals in a set of uplink resources configured for a user equipment (UE) and first scheduling information for a set of energy transfer signals by the network entity in at least a subset of the set of uplink resources;
receiving second control signaling indicating second scheduling information for a set of uplink transmissions for the UE to perform in the set of uplink resources; and
performing one or more uplink transmissions of the set of uplink transmissions based at least in part on the capability of the network entity to support transmission of energy transfer signals in the set of uplink resources configured for the UE, the first scheduling information, and the second scheduling information.

25. The method of claim 24, further comprising:
receiving, with the first control signaling, an indication that the network entity supports half duplex transmission of energy transfer signals and reception of uplink transmissions in the set of uplink resources; and
canceling a subset of uplink transmissions of the set of uplink transmissions according to a scheduling overlap between the subset of uplink transmissions and one or more energy transfer signals of the set of energy transfer signals.

26. The method of claim 25, wherein the one or more uplink transmissions comprise a second subset of uplink transmissions of the set of uplink transmissions, the second subset of uplink transmissions comprising each uplink transmission of the set of uplink transmissions absent from the subset of uplink transmissions of the set of uplink transmissions.

27. The method of claim 24, wherein receiving the first control signaling indicating the capability comprises:
receiving an indication that the network entity supports full duplex transmission of energy transfer signals and reception of uplink transmissions in the set of uplink resources, and wherein the one or more uplink transmissions comprises an entirety of the set of uplink transmissions.

28. The method of claim 27, wherein the set of uplink resources comprises one of uplink slots within a time division duplexing carrier or an uplink band of a frequency division duplexing carrier.

29. The method of claim 24, wherein receiving the first control signaling indicating the capability comprises:
receiving an indication that the network entity supports transmission of an energy transfer signal and reception of an uplink transmission in a subset of uplink resources of the set of uplink resources.

30. A method for wireless communications at a network entity, comprising:
transmitting first control signaling indicating a capability of the network entity to support transmission of energy transfer signals in a set of uplink resources configured for a user equipment (UE) and first scheduling information for a set of energy transfer signals in at least a subset of the set of uplink resources;
transmitting second control signaling indicating second scheduling information for a set of uplink transmissions by the UE for the UE to perform in the set of uplink resources;
transmitting the set of energy transfer signals; and
receiving one or more uplink transmissions of the set of uplink transmissions based at least in part on the capability of the network entity to support transmission of energy transfer signals in the set of uplink resources configured for the UE, the first scheduling information, and the second scheduling information.

* * * * *